United States Patent
Kim et al.

(10) Patent No.: US 9,900,728 B2
(45) Date of Patent: Feb. 20, 2018

(54) METHOD FOR SUBSCRIPTION AND NOTIFICATION IN M2M COMMUNICATION SYSTEM AND APPARATUS FOR SAME

(71) Applicant: LG ELECTRONICS INC., Seoul (KR)

(72) Inventors: Seongyun Kim, Seoul (KR); Heedong Choi, Seoul (KR); Seungmyeong Jeong, Seoul (KR); Seungkyu Park, Seoul (KR); Hongbeom Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/787,440

(22) PCT Filed: May 16, 2014

(86) PCT No.: PCT/KR2014/004429
§ 371 (c)(1),
(2) Date: Oct. 27, 2015

(87) PCT Pub. No.: WO2014/185754
PCT Pub. Date: Nov. 20, 2014

(65) Prior Publication Data
US 2016/0088420 A1    Mar. 24, 2016

Related U.S. Application Data

(60) Provisional application No. 61/823,913, filed on May 16, 2013, provisional application No. 61/845,351, (Continued)

(51) Int. Cl.
*H04W 4/00* (2009.01)
*H04W 68/00* (2009.01)
(Continued)

(52) U.S. Cl.
CPC .......... *H04W 4/005* (2013.01); *H04L 67/025* (2013.01); *H04W 28/16* (2013.01); *H04W 68/00* (2013.01); *H04L 67/28* (2013.01)

(58) Field of Classification Search
None
See application file for complete search history.

(56) References Cited

U.S. PATENT DOCUMENTS

2011/0128911 A1    6/2011    Shaheen
2011/0213871 A1    9/2011    Digirolamo et al.
(Continued)

FOREIGN PATENT DOCUMENTS

CN    102255931 A    11/2011
KR    10-2011-0101086 A    9/2011
(Continued)

OTHER PUBLICATIONS

ETSI, "Machine-to-Machine communications (M2M); Functional architecture," ETSI TS 102 690 V2.0.13, May 2013, pp. 1-328.
(Continued)

*Primary Examiner* — Eunsook Choi
(74) *Attorney, Agent, or Firm* — Birch, Stewart, Kolasch & Birch, LLP

(57) ABSTRACT

The present invention relates to a method performed in a machine-to-machine (M2M) device comprising a first resource and a second resource, and an apparatus for the same. The method comprises the steps of: adding first condition information to filtering properties of the first resource; receiving, from a first entity, a request message including first information indicating an address corresponding to the second resource and second information indicating an operation to be performed in the device; and transmitting a notification message to a second entity indicated by address information set in the first resource when predetermined conditions are satisfied, wherein the predetermined conditions include (1) a condition that the second resource should correspond to a parent resource of the first resource and (2) a condition that the first condition information should include a parameter corresponding to the operation,
(Continued)

and wherein the first resource and the second resource respectively show data structures which are uniquely addressable by using unique addresses.

16 Claims, 13 Drawing Sheets

Related U.S. Application Data filed on Jul. 11, 2013, provisional application No. 61/937,629, filed on Feb. 10, 2014.

(51) Int. Cl.
*H04L 29/08* (2006.01)
*H04W 28/16* (2009.01)

(56) References Cited

U.S. PATENT DOCUMENTS

| | | |
|---|---|---|
| 2012/0016942 A1 | 1/2012 | Cherian et al. |
| 2012/0057476 A1 | 3/2012 | Chan et al. |
| 2012/0281649 A1* | 11/2012 | Zhou ............... H04W 72/02 370/329 |
| 2012/0327896 A1 | 12/2012 | Lee et al. |
| 2014/0330929 A1* | 11/2014 | Dong ............... A61B 5/0022 709/217 |
| 2015/0055557 A1* | 2/2015 | Dong ............... H04W 4/005 370/328 |
| 2015/0245161 A1* | 8/2015 | Pareglio ............ H04W 4/005 455/435.1 |

FOREIGN PATENT DOCUMENTS

| | | |
|---|---|---|
| KR | 10-2012-0096528 A | 8/2012 |
| KR | 10-2012-0125185 A | 11/2012 |
| KR | 10-2013-0038378 A | 4/2013 |

OTHER PUBLICATIONS

ETSI, "Machine-to-Machine communications (M2M); mIa, dIa and mId interfaces," ETSI TS 102 921 V1.1.1, Feb. 2012, pp. 1-538.

\* cited by examiner

_US 9,900,728 B2_

METHOD FOR SUBSCRIPTION AND NOTIFICATION IN M2M COMMUNICATION SYSTEM AND APPARATUS FOR SAME

CROSS-REFERENCE TO THE RELATED APPLICATIONS

This application is the National Phase of PCT International Application No. PCT/KR2014/004429, filed on May 16, 2014, which claims priority under 35 U.S.C. 119(e) to U.S. Provisional Application Nos. 61/823,913, filed on May 16, 2013, 61/845,351, filed on Jul. 11, 2013 and 61/937,629, filed on Feb. 10, 2014, all of which are hereby expressly incorporated by reference into the present application.

TECHNICAL FIELD

The present invention pertains to a Machine-to-Machine (M2M) communication system. More specifically, the present invention pertains to a method and apparatus for subscribing and notifying an operation performed for a specific resource in a M2M system.

BACKGROUND ART

Recently, interest in M2M (machine-to-machine) communication is rising. The M2M communication corresponds to communication performed between machines without a human involvement. The M2M communication is also referred to as MTC (machine type communication) or IoT (internet of things) communication. A terminal used for the M2M communication is referred to as a M2M device. In general, the M2M device has characteristics such as low mobility, time tolerant or delay tolerant, small data transmission and the like. The M2M device is used in a manner of being connected with a M2M server, which stores and manages M2M communication information at the center. If a M2M device is connected according to a communication scheme different from each other, the M2M device and the M2M server are connected with each other via a M2M gateway in a section where a communication scheme is changed. In doing so, a whole M2M system may be constructed. Such a service as object tracking, power metering, automatic payment system, healthcare service, remote controlling, and the like may be provided by the M2M system.

The present invention relates to a M2M system.

DISCLOSURE OF THE INVENTION

Technical Object

An object of the present invention is to provide a method for efficiently transmitting and receiving a signal in a M2M system and an apparatus therefor.

Another object of the present invention is to provide a method for efficiently performing subscription/notification for a specific resource in a M2M system and an apparatus therefor.

Still another object of the present invention is to provide a method for efficiently subscribing and notifying an operation performed for a specific resource in a M2M system and an apparatus therefor.

Still another object of the present invention is to provide a method of subscription and notification based on an operation performed irrespective of a status change of a subscription target resource in a M2M system and an apparatus therefor.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In an aspect of the present invention, provided herein is a method performed by a Machine-to-Machine (M2M) device in which a first resource and a second resource are configured, the method comprising: adding first condition information or second condition information to a filtering attribute of the first resource; receiving a request message from a first entity, the request message comprising first information indicating an address corresponding to the second resource and second information indicating an operation to be performed by the device; and when a specific condition is satisfied, sending a notification message to a second entity indicated by address information configured in the first resource, wherein the specific condition includes (1) the second resource corresponds to a parent resource of the first resource, (2) when the filtering attribute of the first resource comprises the first condition information, the first condition information comprises a variable corresponding to the operation, (3) when the filtering attribute of the first resource comprises the second condition information, and when the second resource or a child resource of the second resource is changed by the operation, the second condition information comprises a variable corresponding to a changed status of the second resource or the child resource of the second resource, and wherein each of the first resource and the second resource represents a data structure which is uniquely addressable using a unique address.

In another aspect of the present invention, provided herein is a Machine-to-Machine (M2M) device in which a first resource and a second resource are configured, the M2M device comprising: a network interface unit; and a processor, the processor configured to add first condition information or second condition information to a filtering attribute of the first resource, receive a request message from a first entity, the request message comprising first information indicating an address corresponding to the second resource and second information indicating an operation to be performed by the device, when a specific condition is satisfied, send a notification message to a second entity indicated by address information configured in the first resource, wherein the specific condition includes (1) the second resource corresponds to a parent resource of the first resource, (2) when the filtering attribute of the first resource comprises the first condition information, the first condition information comprises a variable corresponding to the operation, (3) when the filtering attribute of the first resource comprises the second condition information, and when the second resource or a child resource of the second resource is changed by the operation, the second condition information comprises a variable corresponding to a changed status of the second resource or the child resource of the second resource, and wherein each of the first resource and the second resource represents a data structure which is uniquely addressable using a unique address.

Preferably, the first condition information is used for monitoring whether an operation of accessing the second resource or the child resource of the second resource is attempted irrespective of whether the operation of accessing the second resource or the child resource of the second resource is performed.

Preferably, the variable indicates at least one of creation, retrieval, update, or deletion.

Preferably, the notification message comprises a parameter corresponding to the operation.

Preferably, when the second condition information is added to the filtering attribute of the first resource, the notification message comprises a parameter corresponding to the changed status.

Preferably, the specific condition further includes (4) the second entity sending the request message has a retrieve permission for the second resource, (5) when the first entity and the second entity are different from each other, the first entity has an access right for sending a notification message to the second entity.

Preferably, the first resource corresponds to a resource for subscription, and the second resource corresponds to a subscription target resource.

Advantageous Effects

According to the present invention, it is able to efficiently transmit and receive a signal in a M2M system.

According to the present invention, it is able to efficiently perform subscription/notification for a specific resource in a M2M system.

According to the present invention, it is able to efficiently subscribe and notify an operation performed for a specific resource in a M2M system.

According to the present invention, it is able to subscribe and notify based on an operation performed irrespective of a status change of a subscription target resource in a M2M system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

DETAILED DESCRIPTION

The preferred embodiments of the present invention will now be described in detail with reference to the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be implemented without such specific details.

When describing the present invention, in order to avoid obscuring the concepts of the present invention, a well-known structure or device may be omitted and important functions of the structures and devices may be shown in a form of block diagram. The same reference numbers will be used throughout the drawings to refer to the same or like parts.

In the present invention, a machine-to-machine (M2M) device refers to a device for M2M communication. The M2M device may be fixed or mobile. The M2M device may transmit and receive user data and/or control information to/from a M2M server by communicating with the M2M server. The M2M device may be referred to as terminal equipment, Mobile Station (MS), Mobile Terminal (MT), User Terminal (UT), Subscriber Station (SS), wireless device, Personal Digital Assistant (PDA), wireless modem, handheld device, etc. In the present invention, the M2M server may refer to a server for M2M communication, and may be implemented as a fixed station or a mobile station. In the present invention, when a network to which a M2M device is attached and a network to which a M2M server is attached are different from each other, a M2M gateway refers to an apparatus serving as a connection point entering from one network to the other network. Further, a M2M gateway may perform a function as a M2M device, and, for example, may perform a function such as managing a M2M device connected to the M2M gateway, receive one message and forward the message or a modified message to M2M devices connected to the M2M gateway, or a message aggregation. The term "M2M device" may be used to collectively refer to a M2M gateway and a M2M server, and thus a M2M gateway or a M2M server may be referred to as a M2M device.

In addition, in the present specification, the term "entity" may refer to a hardware such as a M2M device, a M2M gateway, or a M2M server, or the term "entity" may refer to a software component of M2M application layer or M2M (common) service layer as described below.

In the present specification, the present invention is described on the basis of a M2M system, but the present invention is not limited to the M2M system. For example, the present invention may be applied to a system in accordance with a client-server (or sender-responder) model in a similar/same manner.

Figure 1:
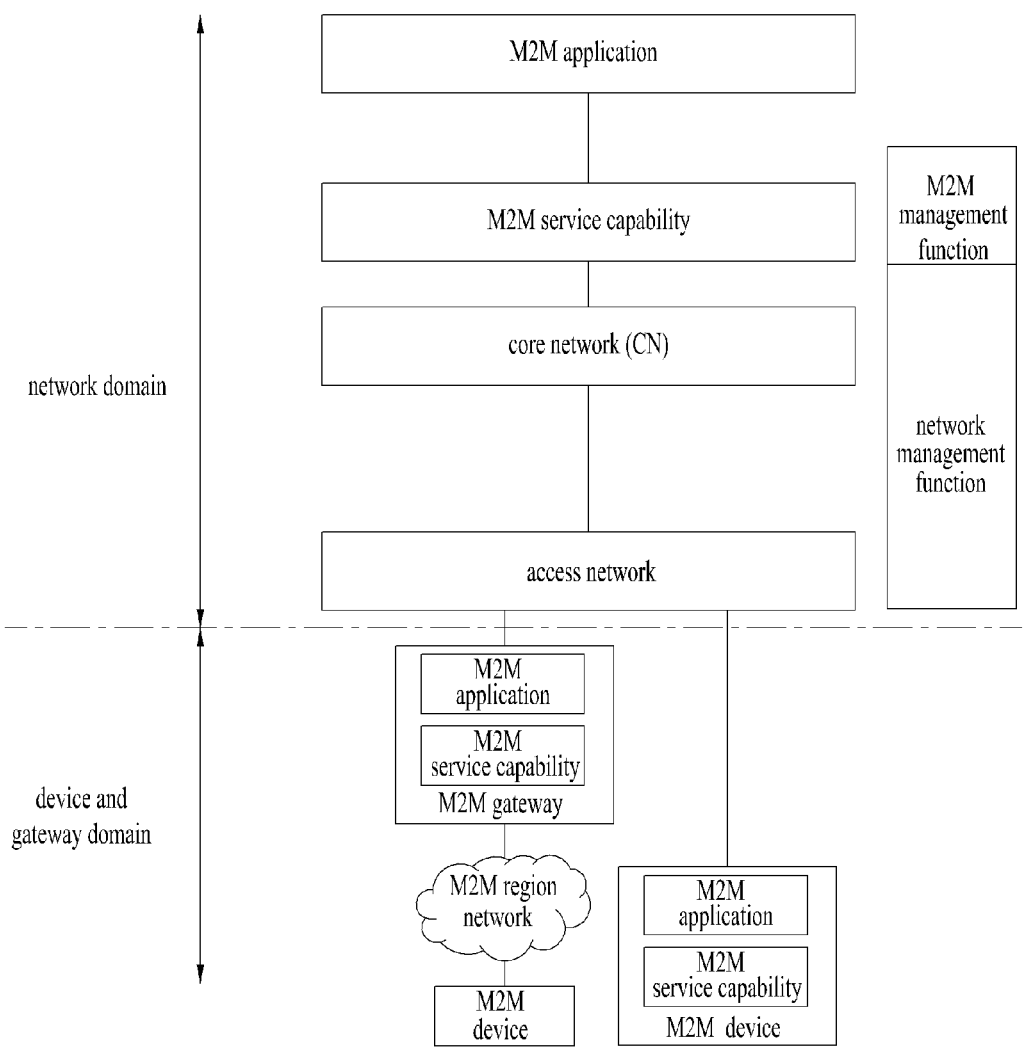
FIG. 1 illustrates an example of a M2M system.

FIG. 1 illustrates an example of a M2M system. FIG. 1 illustrates an example of a M2M system in accordance with ETSI (European telecommunications standards institute) TS (technical specification).

The M2M system in accordance with the ETSI TS defines a common M2M service framework for various M2M applications. A M2M application may indicate a software component implementing such a M2M service solution as e-health, city automation, a connected consumer, automotive and the like. The M2M system provides functions commonly required for implementing the various M2M applications, and the commonly required functions may be referred to as a M2M service or a M2M common service. If the M2M common service is used, a M2M application may be easily implemented without configuring a basic service framework again for each M2M application.

The M2M service is provided in a form of a set of service capability (SC), the M2M application may access the set of SC (service capability) via an open interface and may use a M2M service or function provided by the SC (service capability). SC may provide a function constructing a M2M service (e.g. device management, location, discovery, group management, registration, security, etc). A service capabilities layer (or SC layer) or a service capability entity (or SC entity) may correspond to a set of functions for a M2M service which may be used when a M2M application is provided on a service framework.

The SC (service capability) may be represented as xSC. In this case, x may be represented by one of N, G and D. The x indicates where the SC (service capability) exists among a network (and/or a server), a gateway and a device. For example, NSC indicates SC (service capability) existing in a network and/or a server, and GSC indicates SC (service capability) existing in a gateway.

A M2M application may exist in a network, a gateway or a device. The M2M application existing in a network or a directly connected with a server may be referred to as a M2M network application, or may be simply referred to as a NA (network application). For example, the NA corresponds to software which is implemented in a manner of being directly connected with a server, and the NA may perform a role of communicating with a M2M gateway or a M2M device and managing the M2M gateway and the M2M device. The M2M application existing in the device may be referred to as a M2M device application, or may be simply referred to as a DA (device application). For example, the DA corresponds to software which is implemented in a M2M device, and the DA may be able to deliver sensor information and the like to the NA. The M2M application existing in the gateway may be referred to as a M2M gateway application, or may be simply referred to as a GA (gateway application). For example, the GA may play a role of managing a M2M gateway, and the GA may provide a M2M service or function (e.g. SCs (service capabilities) or SC (service capability)) to the DA. The M2M application may collectively refer to an application entity (AE) or an application layer.

Referring to FIG. 1, a M2M system architecture may be divided into a network domain and a device and gateway domain. The network domain may include functions for M2M system management and functions for network management. The functions for the M2M system management may be performed by M2M SCs (service capabilities) and a M2M application managing device existing in the device and gateway domain. The function for network management may be performed by a core network and an access network. Hence, in the example shown in FIG. 1, the core network and the access network provide connection between entities rather than performing a M2M function. M2M communication may be performed between M2M SCs (service capabilities) in the network domain and the device and gateway domain via the core network and the access network. A M2M application of each domain may give and take a signal or information via M2M SCs (service capabilities) of a corresponding domain.

The access network corresponds to an entity enabling a M2M device and gateway domain to communicate with a core network. Examples of the access network include xDSL (digital subscriber line), HFC (hybrid fiber coax), satellite, GERAN, UTRAN, eUTRAN, wireless LAN, WiMAX and the like.

The core network corresponds to an entity providing a function such as IP (internet protocol) connection, service and network control, interconnection, roaming and the like. The core network includes a 3GPP ($3^{rd}$ generation partnership project) core network, an ETSI TISPAN (telecommunications and internet converged services and protocols for advanced networking) core network, a 3GPP2 core network, and the like.

M2M SC (service capability) provides a M2M common service function (CSF) capable of being shared by various M2M network applications, and exposes a M2M service via an open interface, thereby enabling M2M applications to use the M2M service. A layer including such M2M SC entities or M2M common service functions may be referred to as M2M SCL (service capability layer).

A M2M application corresponds to an entity operating service logic and being capable of using M2M SCs (service capabilities) via an open interface. A M2M application layer may refer to a layer including the M2M application and a related operational logic.

A M2M device corresponds to an entity operating a M2M device application via M2M SCs (service capabilities). The M2M device may directly communicate with a M2M server of a network domain, or may communicate with the M2M server of the network domain via a M2M gateway. In case of being connected via a M2M gateway, the M2M gateway operates like a proxy. The M2M device may include a M2M application and/or M2M SCs (service capabilities).

A M2M area network provides connectivity between a M2M device and a M2M gateway. In this case, a network between the M2M gateway and a M2M server and a network between the M2M device and the M2M gateway may be different from each other. For example, the M2M area network may be implemented using a PAN (personal area network) technology such as IEEE 802.15.1, Zigbee, Bluetooth, IETF ROLL, ISA 100.11a and a local network technology such as PLC (power line communication), M-BUS, wireless M-BUS, KNX and the like.

The M2M gateway is an entity managing a M2M application via M2M SCs (service capabilities) and providing a service to the M2M application. The M2M gateway may perform a role of a proxy between a M2M device and a network domain and may perform a role of providing a service to an ETSI non-compliant M2M device. The M2M gateway may refer to an entity having a function of a gateway among M2M devices. The M2M gateway may include a M2M application and/or M2M SCs (service capabilities).

The M2M architecture shown in FIG. 1 is just an example and a name of each entity may vary. For example, M2M SC (service capability) may be referred to as a M2M common service function (CSF), and a SCL (service capability layer) may be referred to as a common service layer (CSL) or common service entity (CSE). A M2M application may be referred to as an application entity (AE), and a M2M application layer may be simply referred to as an application layer. Similarly, a name of each domain may vary as well. For example, in one M2M system, a network domain may be referred to as an infrastructure domain, and a device and gateway domain may be referred to as a field domain.

As shown in FIG. 1, a M2M system may be construed as a layered structure including a M2M application layer and a M2M SC (service capability) layer for M2M communication.

Figure 2:
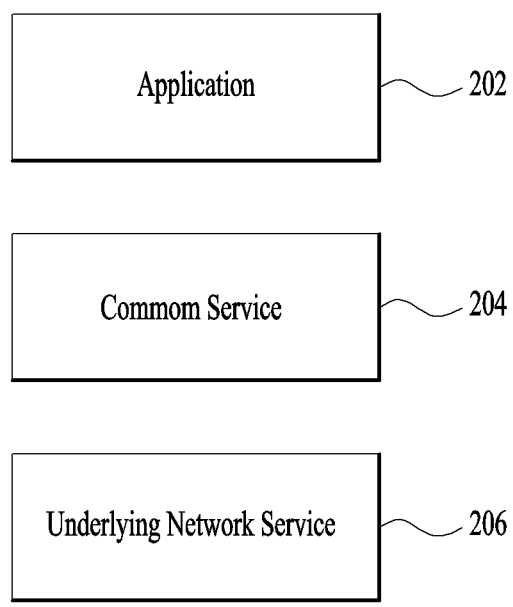
FIG. 2 illustrates an example of a layered structure of a M2M system.

FIG. 2 illustrates an example of a layered structure of a M2M system.

Referring to FIG. 2, a M2M system may include an application layer 202, a common service layer 204 and an underlying network services layer 206. As described in the above, application layer 202 may correspond to a M2M application layer, and common service layer 204 may correspond to a M2M SCL. Underlying network services layer 206 provides services such as device management, a location service and device triggering to common service layer 204 in a core network.

Figure 3:
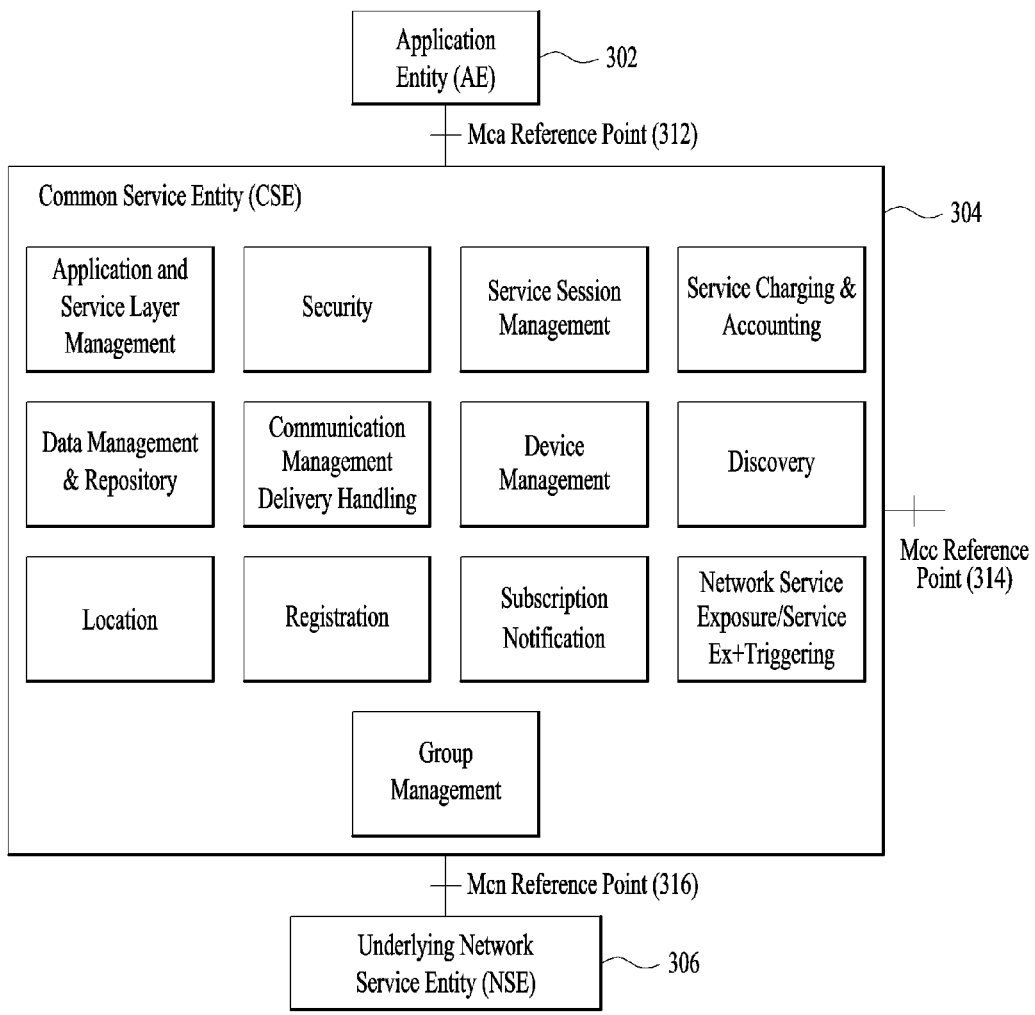
FIG. 3 illustrates an example of a functional architecture of a M2M system.

FIG. 3 illustrates an example of a functional architecture of a M2M system. In terms of functionality, M2M system architecture may include an application entity (AE) 302, a common service entity (CSE) 304, and an underlying network service entity (NSE) 306. Each of entities 302, 304, 306 may communicate with each other via a reference point supported by common service entity 304. The reference point plays a role in designating a communication flow between entities 302, 304, 306. The reference point may be represented as Mcx, and Mc means "M2M communications". In the present specification, a Mca reference point, a Mcc reference point and a Mcn reference point may be denoted as Mca, Mcc and Mcn, respectively.

Referring to FIG. 3, Mca reference point 312 designates a communication flow between application entity (AE) 302 and common service entity (CSE) 304. Mca reference point 312 enables AE 302 to use a service provided by CSE 304, and enables CSE 304 to communicate with AE 302. Mca reference point 312 may indicate an interface between a M2M application layer and a M2M common service layer (or entity).

Mcc reference point 314 designates a communication flow between different common service entities (CSEs) 304. Mcc reference point 314 enables CSE 304 to use a service of another CSE when CSE 304 provides a required function. A service provided by Mcc reference point 314 may be dependent on the functions supported by CSE 304. Mcc reference point 314 may indicate an interface between M2M common service layers.

Mcn reference point 316 designates a communication flow between CSE 304 and underlying network service entity (NSE) 306. In order to make CSE 304 provide a required function, Mcn reference point 316 enables the CSE to use a service provided by NSE 306. Mcn reference point 312 may indicate an interface between the M2M common service layer and the M2M underlying network layer.

In the example shown in FIG. 3, CSE 304 may provide various common service functions (CSFs). For example, CSE 304 may include at least one of an application and service layer management function, a communication management and delivery handling function, a data management and repository function, a device management function, a group management function, a discovery function, a location function, a network service exposure/service execution and triggering function, a registration function, a security function, a service charging and accounting function, a service session management function, or a subscription/notification function. CSE 304 represents an instance of the common service functions and provides a subset of the common service functions capable of being used and shared by M2M applications. The common service functions are briefly explained in the following.

Application and service layer management (ASM): provides a function of managing AEs and CSEs. For example, the ASM function may configure a function of a CSE, troubleshoot the function of the CSE, and upgrade the function Moreover, the ASN function may upgrade a function of an AE.

Communication management and delivery handling (CMDH): provides a communication with another CSEs, AEs and NSEs. For example, the CMDH function may determine when and how to use a connection for CSE-to-CSE communication and may control specific requests to be delivered in a manner of being delayed.

Data management and repository (DMR): enables M2M applications to exchange and share data with each other. For example, the DMR function may collect a great amount of data, aggregate the data with each other, convert the data into a specific format, and store the converted data.

Device management (DMG): manages a device function not only for a M2M gateway and a M2M device but also for devices existing in a M2M area network. For example, the DMG function may perform application installation and configuration, firmware update, logging, monitoring, diagnostics, network topology management and the like.

Discovery (DIS): searches for information such as information and a resource within a given range and condition according to a request.

Group management (GMG): For example, a group may be generated by combining a resource, a M2M device or a M2M gateway with each other, this function handles a group-related request.

Location (LOC): This function enables a M2M application to obtain location information of a M2M device or a M2M gateway.

Network service exposure/service execution and triggering (NSSE): enables communication of an underlying network to be performed and makes a service or a function provided by the underlying network available.

Registration (REG): This function enables a M2M application or another CSE to register to a specific CSE. Registration is performed to use a M2M service function of the specific CSE.

Security (SEC): performs a role in handling of sensitive data such as a security key, establishing security-related association, authentication, authorization, protecting ID (identity) and the like.

Service charging and accounting (SCA): performs a role in providing a charging function to an AE or CSE.

Service session management (SSM): performs a role in managing a M2M session of a service layer for end-to-end communication.

Subscription/notification (SUB): in case of subscribing a change of a specific resource, when the resource is changed, performs a role of notifying the change.

Figure 4:
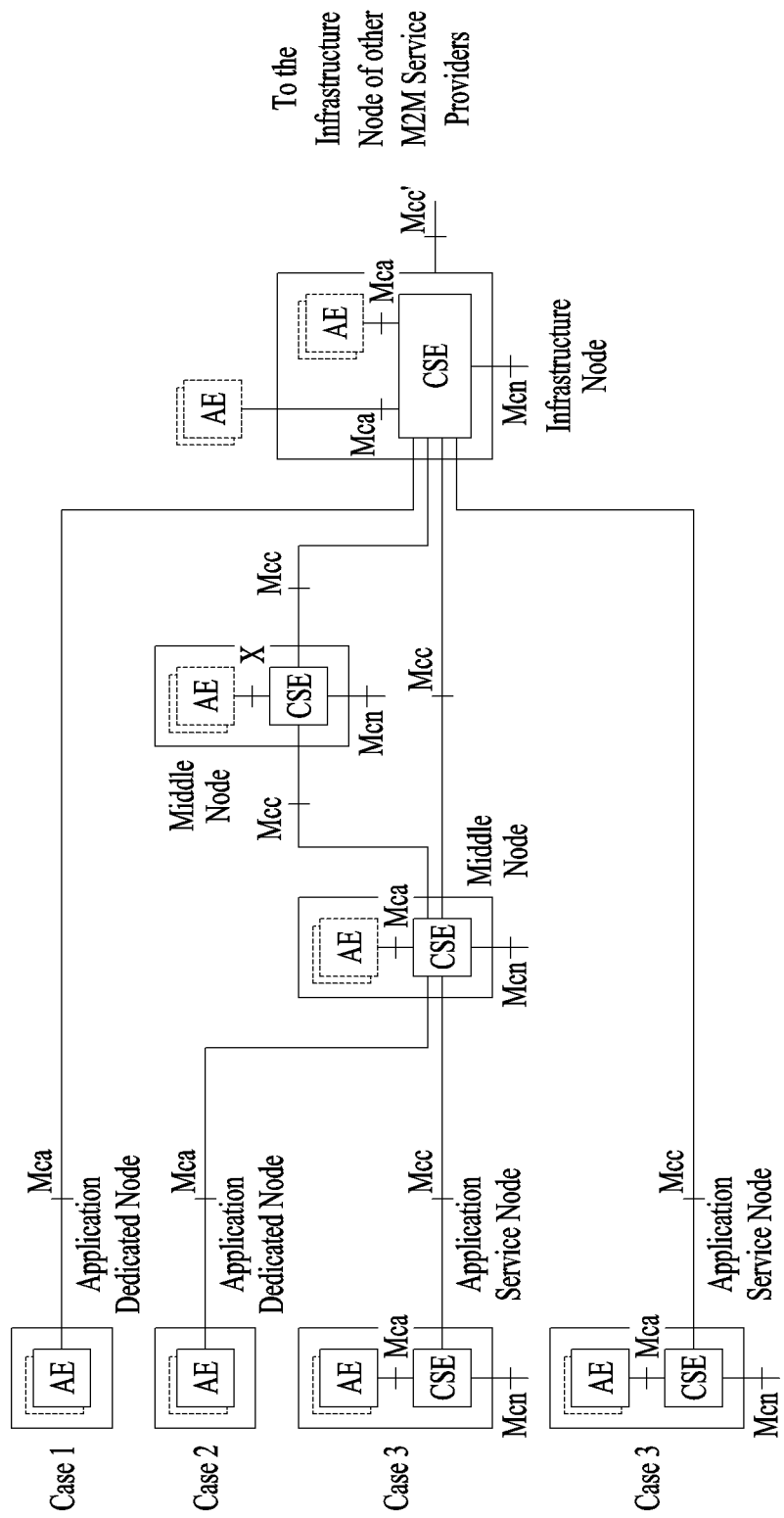
FIG. 4 illustrates an example of a M2M system configuration.

FIG. 4 illustrates an example of a M2M system configuration. In the present specification, a node corresponds to an entity including one or more M2M applications or an entity including one CSE and zero or more M2M application.

A node including at least one or more application entities (AEs) but not including a common service entity (CSE) may be referred to as an application dedicated node (ADN). The ADN may communicate with one middle node (MN) or one infrastructure node (IN) via a Mca. The ADN may be referred to as a M2M device having a constrained capability. In this case, the M2M device having a constrained capability may correspond to a M2M device not including a common service layer or a common service entity (CSE). The M2M device having a constrained capability may be simply referred to as a constrained M2M device.

A node having at least one common service entity (CSE) and at least one or more M2M application entity (AE) may be referred to as an application service node (ASN). The ASN may communicate with one middle node or one infrastructure node via a Mcc. The ASN may be referred to as a M2M device.

A node including one common service entity (CSE) and zero or more M2M application entity (AE) may be referred to as a middle node (MN). The MN may communicate with one infrastructure node (IN) or another middle node (MN) via a Mcc. Or, the MN may communicate with IN/MN/ASN via the Mcc. Or, the MN may communicate with an ADN via a Mca. The MN may be referred to as a M2M gateway.

A node having a common service entity (CSE) and including zero or more application entity (AE) may be referred to as an infrastructure node (IN). The IN may communicate with at least one middle node (MN) and/or at least one ASN. Or, the IN may communicate with one or more ADNs via a Mca. The IN may be referred to as a M2M server.

Referring to FIG. 4, case 1 shows an example of communication performed between ADN 402 and IN 422. ADN 402 may correspond to a M2M device having a constrained capability. In this case, since ADN 402 does not include a CSE or a common service layer, ADN 402 may communicate with a CSE of IN 422 via Mca. In this case, since ADN 402 does not include a CSE or a common service layer, ADN 402 may not store data generated by an AE or an application layer of AND 402 and may not share the data with another entity. Hence, in the case 1, the data generated by the AE or the application layer of ADN 402 may be stored and shared in the CSE of IN 422.

Case 2 shows an example of communication performed between ADN 404 and MN 414. ADN 404 may also correspond to a M2M device having a constrained capability. Hence, ADN 404 may operate similarly to an operation of case 1 except that ADN 404 is communicating with a CSE of MN 414. In particular, the ADN 404 may communicate with the CSE of the MN 414 via a Mca. And, since ADN 404 does not include a CSE or a common service layer, ADN 404 may not store data generated by an AE or an application layer of AND 404 or share the data with another entity. Hence, the data generated by the AE or the application layer of ADN 404 may be stored and shared in the CSE of IN 414.

Meanwhile, in case 2, MN 414 may communicate with IN 422 via MN 412. In this case, MN 414 and MN 412 may communicate with each other and MN 412 and IN 422 may communicate with each other via Mcc. MN 414 may communicate with IN 422 without passing through MN 412.

Case 3 shows an example of communication performed between ASN 406 and MN 414. Unlike case 1 or case 2, since ASN 406 includes a CSE or a common service layer, data generated by an AE or an application layer of ASN 406 may be stored in the CSE or the common service layer of ASN 406. And, the AE of ASN 406 may communicate with a CSE of MN 414 via the CSE of ASN 406.

Case 4 shows an example of communication performed between ASN 408 and MN 414. Compared to case 3, a CSE of ASN 408 may directly communicate with a CSE of IN 422 without passing through a MN.

IN 422 or 424 may be located in an infrastructure domain or a network domain and may include one CSE and zero or more AE. INs 422, 424 may communicate with each other via Mcc.

Figure 5:
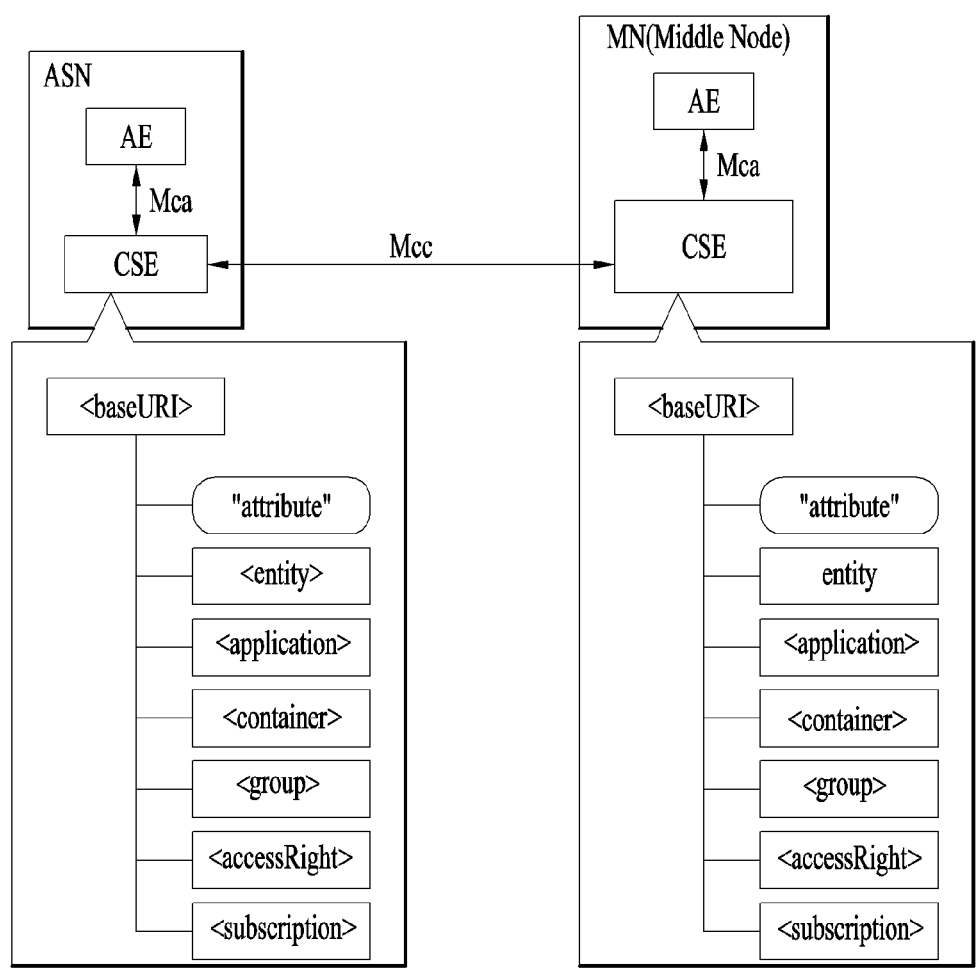
FIG. 5 illustrates an example of a resource used in a M2M system.

FIG. 5 illustrates an example of a resource used in a M2M system.

In a M2M system, an application entity (AE), a CSE, data and the like may be represented as a resource. In a M2M system, a data structure that can be uniquely addressed using a unique address (e.g., URI (universal resource identifier or uniform resource identifier)) is referred to as a resource. In a M2M system, a resource may be represented as a specific data structure, and resources may be logically connected with each other. Hence, a M2M device, a M2M gateway, a CSE or a common service layer of a M2M server may include a resource. On the contrary, an AE or application layer of the M2M system may not have a resource. A resource has a child resource and an attribute. A root resource of a M2M resource may have an attribute and a child resource. For example, a type of the root resource may be denoted by <baseURI> or <CSEBase>. A resource type may be denoted by "<" and ">".

Various resources are defined in a M2M system. M2M applications may perform communication based on a resource which is an instantiation of a resource type. For example, a resource may be used for a M2M service such as registration of an application, reading a sensor value and the like. When an instance of a corresponding resource type is generated, unique address information (e.g., URI) is given to each resource. Similar to a root resource, each resource may include an attribute and a child resource, and may be addressed using unique address information. A specific resource type defines a child resource and an attribute which a resource may have when instantiation. When an instantiation of a specific resource is performed, a resource may have an attribute and a child resource defined by a resource type of the specific resource.

An attribute stores information about a resource itself and may not include a child resource. A child resource may include an attribute and a child resource of its own. For example, a child resource may be a remote CSE resource, an application entity resource, an access control resource, a container resource, a group resource, a subscription resource, and the like.

Remote CSE resource: includes information of another CSE registered (connected) to a corresponding CSE. For example, a type of the remote CSE resource may be denoted by <entity> or <remoteCSE>.

Application entity resource: a resource located under an application entity resource (e.g. <baseURI>/<application> or <CSEBase>/<AE>) of a root resource or a remote CSE resource (e.g. <baseURI>/<entity> or <CSEBase>/<remoteCSE> of a root resource. If an application entity resource is located under an application entity resource (e.g. <baseURI>/<application> or <CSEBase>/<AE>) of a root resource, the application entity resource stores information of an application entity registered (or connected) to a corresponding CSE. If an application entity resource is located under a remote CSE resource (e.g. <baseURI>/<entity> or <CSEBase>/<remoteCSE> of a root resource, the application entity resource stores information of an application entity registered to a specific remote CSE.

For example, a type of an application entity resource may be denoted by <application> or <AE>.

Access control resource: a resource storing information related to access rights. Authorization may be performed using access right information included in the access control resource.

Container resource: stores data per CSE or AE. For example, a container resource may be denoted by <container>.

Group resource: enables a function of grouping several resources into a group and processing as one group. For example, a type of a group resource may be denoted by <group>.

Subscription resource: performs a function of notifying a change of a resource status via a notification. For example, a type of a subscription resource may be denoted by <subscription>.

Figure 6:
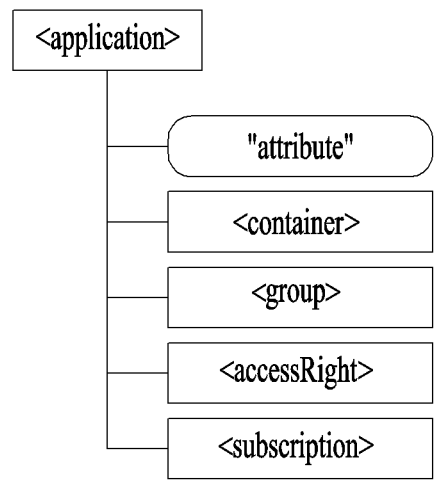
FIG. 6 illustrates an example of a resource for a M2M application.

FIG. 6 illustrates an example of a resource for a M2M application. As described in the above, a resource for a specific M2M application may be stored in an application resource among resources of a CSE or common service layer of a M2M gateway. The resource for the specific M2M application may have an attribute and a child resource. In the example of FIG. 6, a child resource is represented as a type (e.g. denoted by "<", ">") and a real name of the child resource is assigned and stored when an instantiation is performed.

Figure 7:
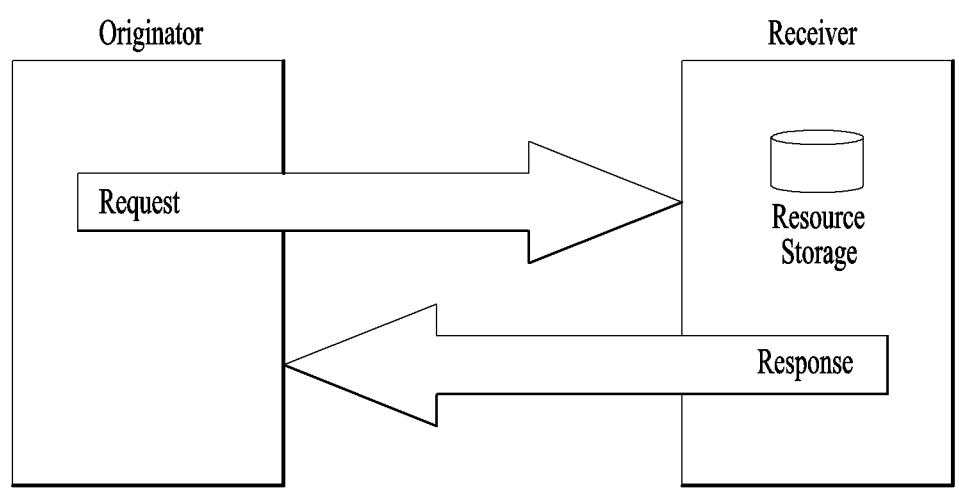
FIG. 7 illustrates an exemplary communication flow of a general M2M system.

FIG. 7 illustrates an exemplary communication flow of a general M2M system. In general, an operation of a M2M system may be performed on the basis of data exchange. For example, in order for a specific device to stop an operation of another device, the specific device may transmit a corresponding command to the another device in a form of data. In order to store data in a device, a data structure having a specific format may be used, and this data structure is referred to as a resource. The resource may be accessible using a unique address (e.g., URI).

Referring to FIG. 7, a Request and Response Scheme may be used for AE-to-CSE connection or CSE-to-CSE connection. An originator may transmit a request message to a receiver so as to request a resource stored in the receiver, and may receive a response message in response to the request message. Likewise, the receiver may receive a request message for requesting a resource from the originator, and may transmit a response message to the originator upon receiving the request message. In the present specification, the request message may also be referred to as a request, and the response may also be referred to as a response. A request message to be transmitted from the originator to the receiver may have the following information.

op: a form of operation to be executed. 'op' may be one of Create, Retrieve, Update, Delete, or Notify. In the present specification, information corresponding to operation may be referred to as a command.

to: URI of a target resource.

fr: identification information (or ID) of an originator having generated the request.

mi: meta information regarding the corresponding request.

cn: content of a resource to be transferred.

If the corresponding request is successfully carried out, the response message may include the following information. The response message may include at least one of the following information, or may include only the result value (rs).

to: identification information (or ID) of an originator having generated the request.

fr: identification information (or ID) of a receiver having received the request.

mi: meta information regarding the request.

rs: the result (e.g., Okay, Okay and Done, Okay and in progress) of the request.

ai: additional information.

cn: content of a resource to be transmitted.

If the corresponding request fails, the response message may include the following information.

to: an originator having generated the request.

fr: ID of a receiver having received the request.

mi: meta information regarding the request.

rs: the result (e.g., Not Okay) of the request.

ai: additional information

In the present specification, an originator indicates a transmitter device (or a CSE or an AE of the transmitter device) and a receiver indicates a receiver device (or a CSE or an AE of the receiver device). And, a device including a resource (or a CSE of the device) is referred to as a hosting device (or a hosting CSE).

As an example, an originator may use a scheme shown in an example of FIG. 7 to create a resource in a receiver. In this case, the originator may send a resource creation request message (e.g., CREATE request) to the receiver. The resource creation request message may include information described in the following.

op: C (Create)

to: URI of a parent of a creation target resource fr: originator ID cn: includes attribute information of the creation target resource, and optionally includes identification information (e.g., a name) of the creation target resource.

When the receiver receives the resource creation request message, the receiver checks whether the originator has been authenticated. Since information (e.g., access rights or an access control policy) about the creation target resource is not known to the receiver yet, the receiver may determine whether to create a resource by authenticating the originator. If the originator is authenticated, creation of a target resource may be allowed. And, if identification information of the creation target resource is included in the resource creation request message, the receiver verifies whether or not the identification information of the creation target resource already exists in a resource structure of the receiver. If valid identification information is not provided (e.g., if the identification information of the creation target resource is overlapped), the receiver may assign identification information of the creation target resource. Similarly, if the resource creation request message does not include the identification information of the creation target resource, the receiver may assign identification information of the creation target resource.

If the creation target resource is successfully created by the receiver, the receiver may transmit a response message including information described in the following to the sender.

to: originator ID fr: receiver ID cn: URI and/or content of the created resource In another example, in order to retrieve information (e.g., attribute information) about a resource of the receiver, the originator may use a scheme shown in an example of FIG. 7. In this case, the originator may send a retrieval request message (e.g., RETRIEVE request) to the receiver to retrieve the information (e.g., attribute information) about the resource of the receiver. The originator may retrieve all or a part of attributes from a target resource of the receiver using the retrieval request message. The retrieval request message may include information described in the following.

op: R (Retrieve)
 to: URI of retrieval target resource
 fr: originator ID

If the receiver receives the retrieval request message from the originator, the receiver verifies whether or not a retrieval target resource exists with reference to URI of the retrieval target resource included in the retrieval request message and checks whether or not the originator has permission for retrieving for the retrieval target resource. If there is no retrieval target resource or the originator does not have proper permission for retrieving, the receiver may send an error through a response message. On the other hand, if a retrieval target resource exists and the originator has proper permission for retrieving, the receiver may send a response message to the originator. The response message may include information described in the following.

to: originator ID
 fr: receiver ID
 cn: content of retrieval target resource

In still another example, the originator may use a procedure shown in an example of FIG. 7 to update attribute information in a specific resource of the receiver. In this case, the originator may send an update request message (e.g., UPDATE request) to the receiver. The originator may update the attribute information with a new value in the specific resource of the receiver using the update request message. The update request message may include information described in the following.

op: U (Update)
 to: URI of an update target resource
 fr: originator ID
 cn: information to be updated in the update target resource If the receiver receives a update request message from the originator, the receiver verifies whether or not there exists an update target resource in the update request message with reference to URI of the update target resource and checks whether the originator is authorized to perform modifying the target resource. If there exists an update target resource and the originator has been properly authorized, the update target resource may be updated by information to be updated (e.g., cn). If the update target resource is successfully updated, the receiver may transmit a response message to the originator. The response message may include information described in the following.

to: originator ID
 fr: receiver ID
 cn: operation result

In still another example, the originator may use a procedure shown in an example of FIG. 7 to delete a specific resource of the receiver. In this case, the originator may send a deletion request message (e.g., DELETE request) to the receiver. The deletion request message may include information described in the following.

op: D (Delete)
 to: URI of a deletion target resource
 fr: sender ID

If the receiver receives the deletion request message from the originator, the receiver verifies whether or not there exists a deletion target resource with reference to URI of a deletion target resource in the deletion request message and checks whether the originator is authorized to delete the target resource. If there is no target resource and the originator has not been authorized, the receiver may send an error through a response message. On the other hand, if there exists a target resource and the originator has been properly authorized, the receiver may send a response message including information described in the following to the originator.

to: originator ID
 fr: receiver ID
 cn: operation result

Figure 8:
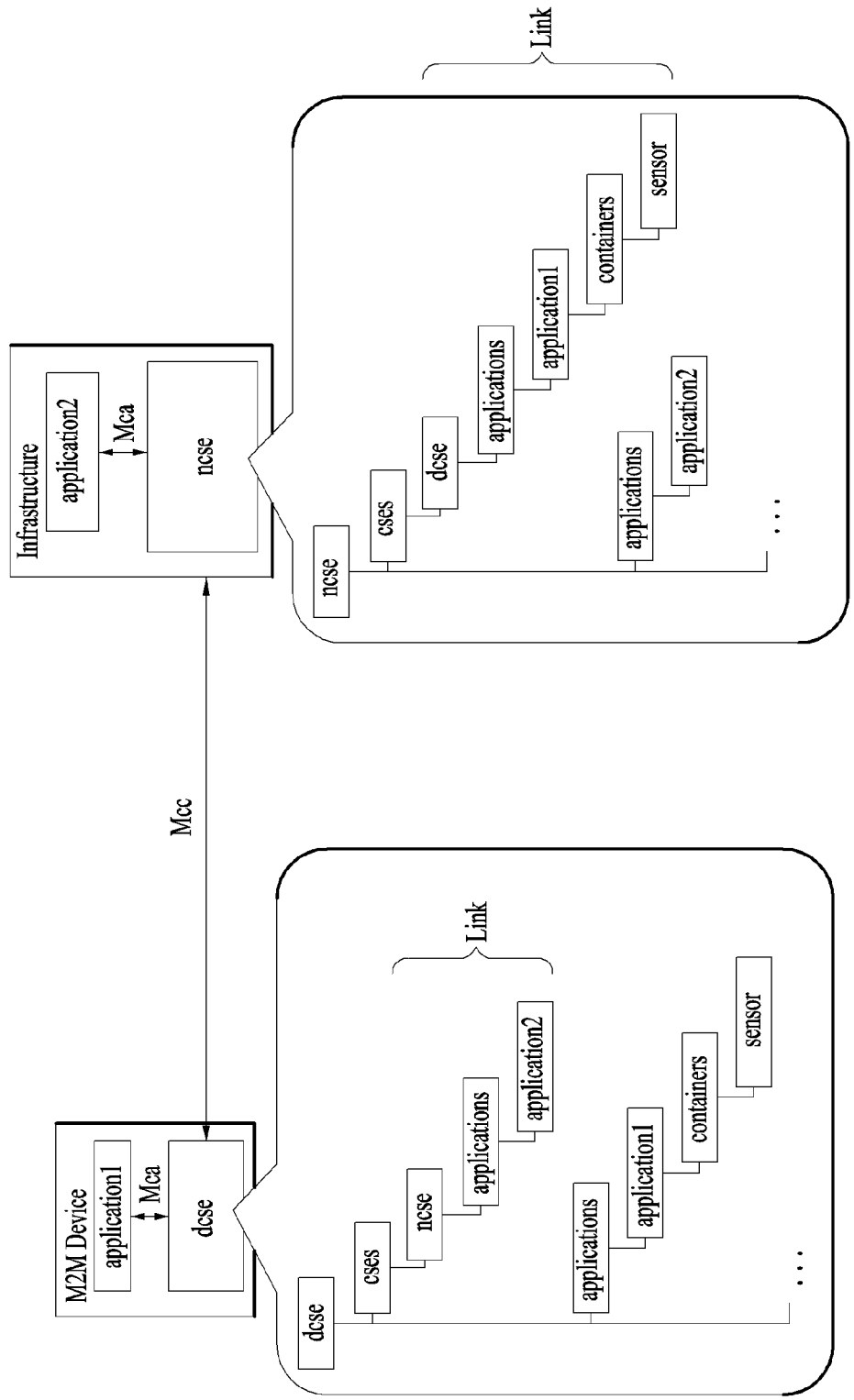
FIG. 8 illustrates an example of different entities interoperating with each other in a M2M system.

FIG. 8 illustrates an example of different entities interoperating with each other in a M2M system.

Referring to FIG. 8, it shows an example that an AE (application 2) registered to an IN (infrastructure node) interoperates with a M2M device. For example, the M2M device may include a sensor which is a physical device, and the AE registered to the IN may retrieve a value of the sensor of the M2M device.

An AE (application1) existing on a M2M device reads a value from a sensor and stores the value in a CSE (dcse) to which the AE is registered in a resource form (e.g., <container> resource). To this end, the AE (application1) existing on the M2M device should register to the CSE existing in the M2M device. As shown in an example of FIG. 8, if the registration of the AE is completed, information related to the registered M2M application is stored in a form of a resource dcse/applications/application1. For example, if a sensor value of the M2M device is stored by the AE (application1) in a container resource under the resource dcse/applications/application1, the AE (application2) registered to the IN (infrastructure node) may access the sensor value. And, in order for the AE (application2) to access the M2M device, the AE (application2) should be register to a CSE (ncse) of the IN (infrastructure node). Similar to the AE (application 1) register being registered to the CSE (dcse), information about the AE (application2) is stored in a resource ncse/applications/application2. And, the AE (application1) and the AE (application2) may communicate with each other via the CSE (ncse) and the CSE (dcse) instead of directly communicating with each other. To this end, it is necessary for the CSE (ncse) and the CSE (dcse) to be register to each other. If the CSE (dcse) registers to the CSE (ncse), information (e.g., link) related to dcse is stored under a resource ncse/cses/dcse resource. As such, the AE (application2) may obtain a path capable of accessing information of the AE (application1) and may be then able to read a sensor value using the path.

Figure 9:
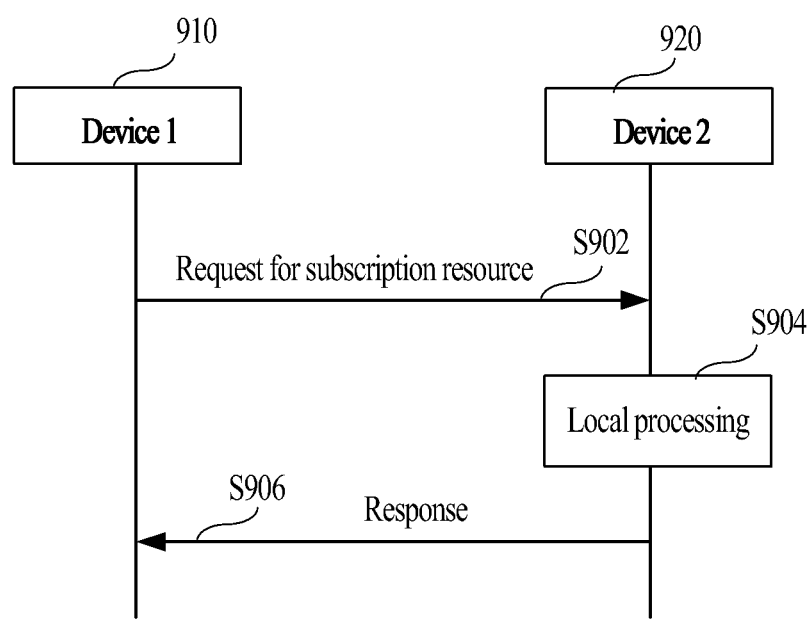
FIG. 9 illustrates an example of a procedure related to a subscription resource.

FIG. 9 illustrates an example of a procedure related to a subscription resource.

In a M2M system (e.g., oneM2M), as a resource changes, an entity interested in the change of the resource may subscribe to a notification of the change. In this case, in order to subscribe to the notification, a resource for subscription should be configured. The resource for subscription may be referred to as a subscription resource or a <subscription> resource. When a subscription resource is created/configured, if a modification/change satisfying a condition configured in the subscription resource occurs in a subscription target resource (also referred to as a subscribed-to resource or a subscribed resource), a device (or an entity) in which the subscription resource is configured may transmit a notification to an address configured in the subscription resource. A device (or an entity) in which a subscription resource is configured and/or which includes a subscription target resource is referred to as a hosting device (or a hosting entity). For example, a subscription target resource may exist in a CSE of a M2M gateway. In this case, the M2M gateway is referred to as a hosting device and the CSE of the M2M gateway is referred to as a hosting CSE.

A subscription procedure may be performed using a subscription resource in a resource-oriented manner. For example, a subscription resource may be created to subscribe to a specific subscription target resource, a condition for subscription may be changed by modifying a subscription resource, and a subscription resource may be deleted when subscription is not needed anymore.

A subscription resource includes information about a subscription target resource (or subscribed-to resource). A relation between the subscription target resource and the subscription resource may be represented as a parent-child relation. For example, a <container> resource including a subscription target resource may have a <subscription> resource as a child resource. When a parent subscription target resource is deleted, the <subscription> resource may be deleted.

If a subscription resource corresponds to a child resource, a notification for indicating a status change of a parent resource may be delivered to an entity specified in a notificationURI attribute in the subscription resource according to configuration (or attribute configuration) of the subscription resource. If an originator has a RETRIEVE (or READ) permission for a subscribable resource, the originator may create a subscription resource. The originator of the subscription resource becomes a resource subscriber. If a modification to a subscription target resource occurs, it is able to determine whether to transmit a notification to the resource subscriber by comparing the modification and a filtering attribute (e.g., filterCriteria attribute) with each other.

In another example, a subscription resource may be created in a specific resource under a parent resource. In this case, the specific resource may correspond to a resource including a collection of subscription resources. The resource may be referred to as a subscription collection resource. For example, a specific entity may create a subscription resource <subscription> as a structure of <resourceURI>/subscriptions/<subscription>. In this case, the specific entity may subscribe to a resource identified by resourceURI via the subscription resource. If change occurs in the resource identified by the resourceURI, a notification may be transmitted to the specific entity according to whether the filterCriteria attribute is satisfied. Further, in this example, a resource <resourceURI>/subscriptions corresponds to a subscription collection resource.

A subscription resource (e.g., <subscription> resource) may have various attributes and child resources. For example, the subscription resource (e.g., <subscription> resource) may have a notificationSchedule resource as a child resource, which includes scheduling information for delivering a notification. And, for example, the subscription resource (e.g., <subscription> resource) may have attributes shown in Table 1. In Table 1, R/W indicates read/write permission, and may correspond to one of READ/WRITE (RW), READ ONLY (RO), or WRITE ONLY (WO). And, in Table 1, a multiplicity indicates the number of occurrence of a corresponding attribute in the <subscription> resource. Table 1 is just an example. An attribute of a subscription resource may be configured in a manner of being different from Table 1.

TABLE 1

| Attribute Name of <subscription> | Multiplicity | RW/RO/WO | Description |
| --- | --- | --- | --- |
| resourceType (rT) | 1 | WO | Resource Type. This WO resourceType attribute stores <in a two capital letters token> the information useful for procedure processing, e.g. CO for <container>, CI for <instance>. |
| expirationTime (eT) | 1 | RW | Time/date after which the resource will be deleted by the hosting CSE. This attribute can be provided by the issuer, and in such a case it will be regarded as a hint to the hosting CSE on the lifetime of the resource. The hosting CSE can however decide on the real expirationTime. If the hosting CSE decides to change the expirationTime attribute value, this is communicated back to the Originator. The lifetime of the resource can: be extended by providing a new value for this attribute in an UPDATE verb. Or by deleting the attribute value, e.g. by not providing the attribute when doing a full UPDATE, in which case the hosting CSE can decide on a new value. |
| parentID (pID) | 1 | RO | The flat URI used to identify the parent resource without using the full structured URI. |
| creationTime (cT) | 1 | RO | Time/date of creation of the resource. |
| lastModifiedTime (lMT) | 1 | RO | Last modification time/date of the resource. |
| filterCriterion (fC) | 0 . . . 1 | RW | Criteria to be used to filter the results. They can either be used in a GET (as query parameters) or in a subscription. |
| labels (lBs) | 1 | RW | Tokens, used as keys for discovering resources. |
| accessRightID (aRI) | 0 . . . 1 | RW | The URI of an <access rights> resource. The permissions defined in the <accessRight> resource that are referenced determine who is allowed to access the resource containing this attribute for a specific purpose (e.g., Retrieve, Update, Delete etc.). If no accessRightID is given at the time of creation, the accessRightID of the parent resource is linked to this attribute. |
| expirationCounter | 0 . . . 1 | RW | When the number of notifications becomes the same as this counter, the <subscription> resource shall be deleted. |
| notificationURI | 1 . . . n | RW | URI where the resource subscriber will receive notifications. |
| aggregationURI | 0 . . . 1 | RW | URI to aggregate notifications from group members of a <group> resource. |
| batchNotify | 0 . . . 1 | RW | Indicates that notifications should be batched for delivery. When set, notification events are temporarily stored until either a specified number is ready to send or until a duration after the first noticifaction event has expired. |

TABLE 1-continued

| Attribute Name of <subscription> | Multiplicity | RW/RO/ WO | Description |
|---|---|---|---|
| rateLimit | 0 . . . 1 | RW | Indicates that notifications should be rate-limited. When set, notification events that exceed a specified number within a specified time are temporarily stored then sent when the number of events sent per specified time falls below the limit. |
| priorSubscriptionNotify | 0 . . . 1 | WO | Indicates that when this subscription is created, whether notification events prior to subscription should be sent, e.g. send prior "n" notifications, if available. |
| interimEventsNotify | 0 . . . 1 | RW | Indicates the notification action to be taken following a period of unreachability, when the resource subscriber becomes reachable (e.g. send "n" iterim notifications, if available.) |
| notificationStoragePriority | 0 . . . 1 | RW | Indicates a priority for this subscription relative to other subscriptions belonging to this same subscriber for retention of notification events when storage is congested. The storage congestion policy which uses this attribute as input is specified in section TBD. |
| notificationStructure | 1 | RW | Type of information that shall be contained in notifications. E.g., modified attribute only of a subscribed-to resource, a whole subscribed-to resource, and/or URI of a corresponding <subscription> resource. |

In an example of Table 1, a filtering attribute (e.g., filterCriteria) corresponds to a list of conditions for modification/change of a subscription target resource, and each of the conditions may be in a logical AND relation. For example, when the filtering attribute (e.g., filterCriteria) includes two conditions, if modification/change of a subscription target resource satisfies all of the two conditions, a notification may be transmitted. An amount of a notification message may be adjusted by configuring a filtering attribute to a subscription resource. If a notification is configured to be transmitted to a notification target entity only when the configured filtering attribute is satisfied, the problem of excessive notification messages may be prevented. Table 2 shows an example of conditions that may be included in the filtering attribute.

TABLE 2

| Condition tag | Matching condition |
|---|---|
| createdBefore | The creationTime attribute of the subscribed resource is chronologically before the specified value. |
| createdAfter | The creationTime attribute of the subscribed resource is chronologically after the specified, value. |
| modifiedSince | The lastModifiedTime attribute of the subscribed resource is chronologically after the specified value. |
| unmodifiedSince | The lastModifiedTime attribute of the subscribed resource is chronologically before the specified value. |
| expireBefore | The expirationTime attribute of the subscribed resource is chronologically before the specified value. |
| expireAfter | The expirationTime attribute of the subscribed resource is chronologically after the specified value. |
| labels | The labels attributes of the subscribed resource matches the specified value. |
| respurceType | The resourceType attribute of the subscribed resource is the same as the specified value. |
| sizeAbove | The contentSize attribute of the <instance> resource is equal to or greater than the specified value. |
| sizeBelow | The contentSize attribute of the <instance> resource is smaller than the specified value. |
| contentType | The typeOfContent attribute of the <instance> resource matches the specified value |
| limit | Limitation the number of matching resources to the specified value. |

Referring to FIG. 9, device 1 910 may perform a procedure shown in FIG. 9 to subscribe to a specific resource of device 2 920. Device 1 910 may or may not correspond to a target receiving a notification according to change of a subscription target resource. In an example of FIG. 9, the specific resource may correspond to the subscription target resource, and, since device 2 920 includes the subscription target resource, device 2 920 may correspond to a hosting device (or an entity).

In step S902, device 1 910 may transmit a request for a subscription resource to device 2 920 to subscribe to a specific resource. For example, the request for subscription resource may correspond to one of a creation request of subscription resource, a retrieval request of subscription resource, a deletion request of subscription resource, or an update request of subscription resource. Each request may have a form of a request message according to the request-response scheme described with reference to FIG. 7. For example, if the request in step S902 corresponds to a creation request, a request for a subscription resource may include op information including C (Create), cn information including attribute information (e.g., notificationURI, filterCriteria, expirationTime, and the like) of the subscription resource, fr information including identification information of device 1 910, and/or to information including identification information of device 2 920. In another example, if the request in step S920 corresponds to a retrieval request, a request for a subscription resource may include op information including R (Retrieve), fr information including identification information of device 1 910, to information including identification information of device 2 920, and/or cn information indicating a retrieval target attribute. In still another example, if the request in step S902 corresponds to a deletion request or an update request, a request for a subscription resource may include all or a part of information described with reference to FIG. 7.

In step S904, device 2 920 validates whether a request for a subscription resource is capable of being processed, and process the request if the request is capable of being processed. For example, if device 2 920 receives a creation request, device 2 920 validates whether a subscription target resource designated in the to information is subscribable, whether an originator (e.g., 910) of the request has RETRIEVE permission for the subscription target resource, whether the originator (e.g., 910) of the request has access right for sending a notification to an entity or a device designated by the notificationURI if the notificationURI does not indicates the originator (e.g., 910) of the request, and whether a hosting device or an entity (e.g., 920) has access rights for sending a notification to an entity or a device designated by the notificationURI. If the aforementioned conditions are all satisfied, device 2 920 may create a subscription resource under a subscription target resource designated by to information.

In another example, if device 2 920 receives a retrieval request, device 2 920 validates whether the originator (e.g., 910) of the request has RETRIEVE permission for a subscription resource. If the aforementioned condition is satisfied, device 2 920 may return all of the subscription resource or a part designated by the retrieval request of the subscription resource.

In still another example, if device 2 920 receives an update request, device 2 920 may verify whether there exists a subscription resource and may then validate whether an attribute corresponds to an attribute to which WRITE can be performed and whether the originator (e.g., 910) of the request has permission to modify an attribute. If the aforementioned conditions are satisfied, device 2 920 updates the provided attribute.

In still another example, if device 2 920 receives a deletion request, device 2 920 validates whether the originator (e.g., 910) of the request has DELETE permission. If the aforementioned condition is satisfied, device 2 920 deletes a subscription resource.

In step S906, device 2 920 may send a response message to device 1 910 after a request for a subscription resource is processed. The response message of step S906 may have a form identical/similar to the response message described with reference to FIG. 7. And, in case of the retrieval request, the response message may include information to be returned.

Figure 10:
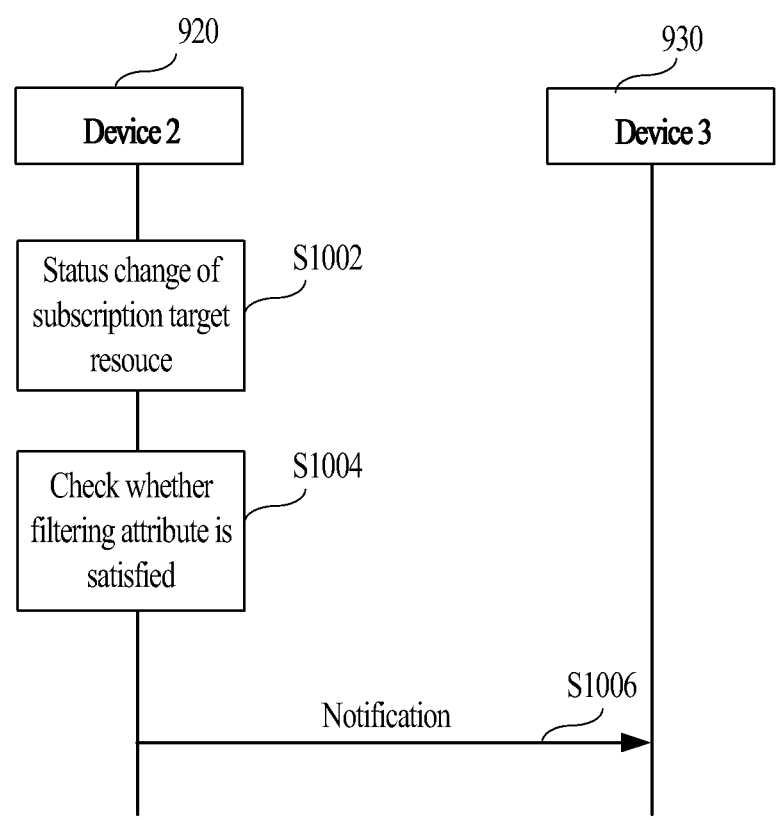
FIG. 10 illustrates an example of a notification procedure.

FIG. 10 illustrates an example of a notification procedure. In the procedure for notification, an originator may correspond to a device or an entity (e.g., 920) hosting a subscription resource. And, a receiver may correspond to a device (or an entity) indicated by address information (e.g., notificationURI) configured in the subscription resource. Specific policy information may be configured for the procedure for notification. The originator may be configured to send a notification message (e.g., NOTIFY) when the policy information is satisfied.

The notification message corresponds to a message triggered for information of a subscription resource. If change of a subscription target resource satisfies a filtering attribute configured in the subscription resource, the notification message may be sent to a receiver indicated by the address information (e.g., notificationURI) configured in the subscription resource. The receiver of the notification message may or may not correspond to a device or an entity which has created/configured the subscription resource. For example, device 1 910 may be identical to device 3 930 or may be different from device 3 930. The notification message may include information described in the following.

fr: identification information or ID of originator (e.g., 920)
    to: address information configured in subscription resource (e.g., notificationURI)
    cn: data representing modified content of subscription target resource and/or subscription reference information (e.g., URI of the subscription resource) which has created the notification message Referring to FIG. 10, in step S1002, originator 920 may detect/sense a change of a subscription target resource. The subscription target resource corresponds to a parent resource of a subscription resource. If a resource or an attribute located at a same level as that of the subscription resource under the subscription target resource is modified/changed, originator 920 (e.g., SUB CSF or CSE, refer to FIG. 3) may recognize it as a change of the subscription target resource.

If the change of the subscription target resource is detected, in step S1004, originator 920 checks whether the change is matched with a filtering attribute (e.g., filterCriteria) configured in the subscription resource. For example, the filtering attribute may include at least one attribute among the attributes shown in the example of Table 2. If the change of the subscription target resource does not satisfy any condition included in the filtering attribute, originator 920 may ignore the change.

If the change of the subscription target resource satisfies all conditions included in the filtering attribute, in step S1006, originator 920 may transmit a notification message to entity 930 indicated by address information (e.g., notificationURI) configured in the subscription resource. For example, the notification message in step S1006 may include identification information of originator 920, data representing modified content of the subscription target resource, and/or subscription reference information which has created the notification message.

Figure 11:
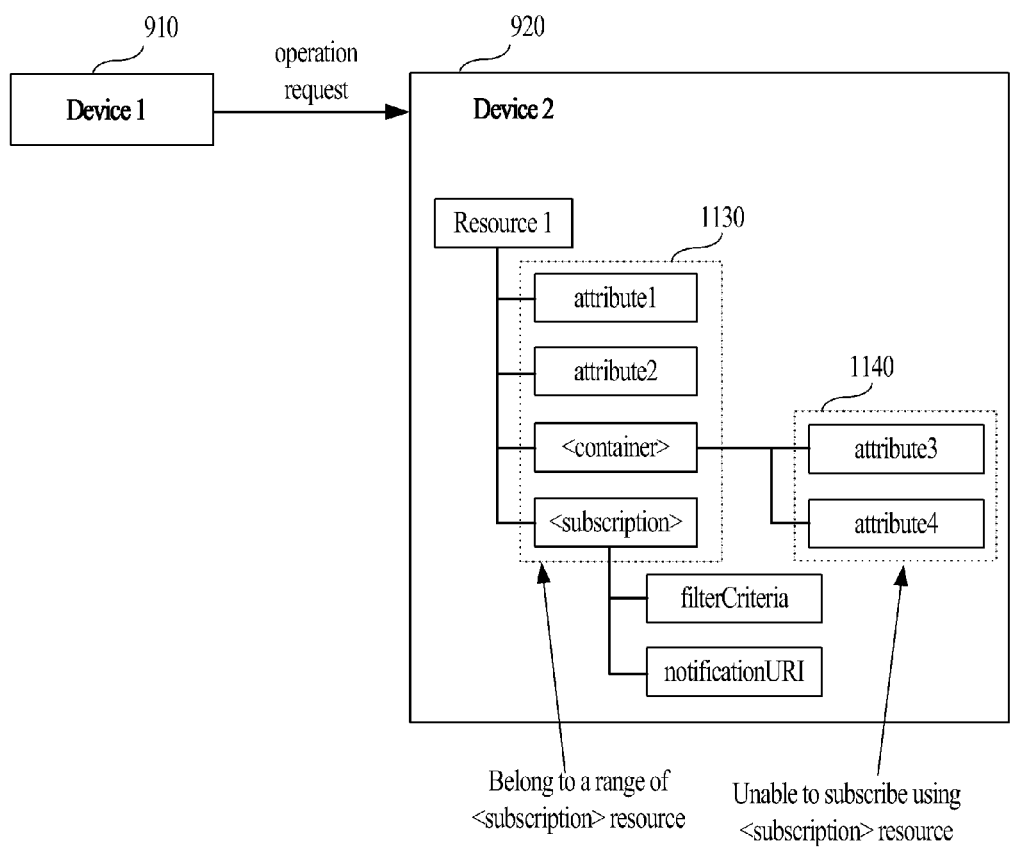
FIG. 11 illustrates an example of using a subscription resource.

FIG. 11 illustrates an example of using a subscription resource.

As described above, a subscription resource may be created/configured as a child resource of a specific resource, and a hosting device or an entity (or a M2M device or an entity in which the subscription resource is created/configured) tracks a status change of a parent resource. If a status change occurs in the parent resource, the hosting device sends a notification message with reference to a notification address (e.g., notificationURI) of the subscription resource. In this case, for example, a subscription/notification (SUB) common service function (CSF) of the M2M device in which the subscription resource is created/configured may take charge of tracking/monitoring the status change of the subscription target resource (e.g., refer to FIG. 3). The M2M device may send a notification to an address (e.g., notificationURI) configured in the subscription resource whenever a modification/change occurs in a subscription target resource (e.g., a parent resource of the subscription resource).

Although the M2M device in which the subscription resource is created/configured receives a request message for a specific operation, if there is no change of the subscription target resource, the M2M device does not send a notification message. For example, if a retrieval request message (e.g., RETRIEVE request) is received from an external device, since the M2M replies attribute information of a target resource via a response message, a change of the target resource does not occur. Hence, in this case, a notification message is not sent to an address (e.g., notificationURI) configured in the subscription resource. As such, if a change does not occur in the subscription target resource, a subscriber (or a subscription device) may not know whether there has been an access to the subscription target resource.

In addition, as described above, a subscription resource (e.g., <subscription> resource) may be created/configured to have a parent-child relation with a subscription target resource. When a subscription resource is created/configured, if another resource (e.g., a child resource or an attribute of the subscription target resource) positioned at a same level as that of the subscription resource is deleted, since a change has occurred in the subscription target resource, a device (or SUB CSF of the device) sends a notification message to an address (e.g., notificationURI) configured in the subscription resource. However, in case that a resource is positioned at a level different from the level of the subscription resource, since the resource is not a target of the subscription resource, a change of the resource may not be identified using the subscription resource. For example, resources in a specific device may be configured to have different access rights per level. For example, a parent resource and a child resource of the parent resource may have access rights different from each other. In this case, when a subscription resource is configured, the subscription resource may operate for a corresponding level only and the subscription resource may not be applied to a different level.

Referring to FIG. 11, a subscription resource (e.g., <subscription> resource) may be created as a child resource of a specific resource (e.g., Resource 1). In this case, the subscription resource corresponds to Resource 1 and a range capable of recognizing a change via the subscription resource (e.g., <subscription> resource) corresponds to 1130. However, a change satisfying a specific filtering condition via the subscription resource (e.g., <subscription> resource) may not be identified for a change of a resource or attribute positioned at a level different from a level of the subscription resource. For example, in an example of FIG. 11, a change such as deletion of an attribute4 under a <container> resource may not be identified.

Further, since a subscription resource is created/configured as a child resource of a subscription target resource, if the subscription target resource is deleted, the subscription resource is deleted as well. Hence, if the subscription target resource is deleted, since the subscription resource itself is deleted, a subscriber may not receive a notification on deletion of the subscription target resource.

Similarly, a same problem may also occur when a resource is created. If a resource is created at a same level as a level of a subscription resource under a subscription target resource, since a change of the subscription target resource occurs, a notification may be sent to a subscriber. However, since the subscription resource may not have access rights for a resource of a different level, if a resource is created in a level different from the level of the subscription resource, a notification may not be sent to a subscriber. In order to subscribe to a change of a resource at a different level, it is necessary to separately create/configure a resource as a child resource of a parent resource of the corresponding level.

For example, in an example of FIG. 11, if attribute5 is created under the subscription target resource (e.g., Resource 1), device 2 920 checks whether filtering information (e.g., filterCriteria) configured in the subscription resource is satisfied. If the criteria information is satisfied, a notification may be transmitted to an address (e.g., notificationURI) configured in the subscription resource. However, in the example of FIG. 11, a change corresponding to a resource creation at a same level as the level of the subscription resource satisfies a specific filtering condition (e.g., when a resource with attribute4 having a specific value is created) may not be recognized.

The aforementioned problem may be solved in a manner of subscribing to an operation performed for a subscription target resource. For example, in case of performing an operation of retrieving the subscription target resource, as mentioned in the foregoing description, since a retrieval operation does not generate a change of the subscription target resource, a notification message is not generated. However, if it is possible to configure to subscribe to the retrieval operation, a notification message can be generated for the operation irrespective of the change of the subscription target resource when the operation of retrieving the subscription target resource is performed.

Likewise, in case that a resource is created or deleted under a subscription resource, if it is able to configure the subscription resource to subscribe to a creation operation or a deletion operation, when a filtering attribute configured in a created or deleted target resource is satisfied, a notification message may be generated.

Likewise, in case that a whole of a subscription target resource is deleted, if it is able to configure the subscription resource to subscribe to a deletion operation, since a notification message is generated before the subscription target resource and the subscription resource are deleted, it is possible to know the deletion of the subscription target resource.

Hence, the present invention proposes a method of subscribing to a specific operation performed in a M2M device. In particular, the present invention proposes to add condition information about a subscription target operation to a subscription resource to subscribe to the specific operation. In more particular, the present invention proposes to add the condition information about the subscription target operation to a filtering attribute (e.g., filterCriteria) of the subscription resource. The subscription target operation may correspond to a command for subscription.

For example, the condition information about the subscription target operation may include first condition information indicating that a notification is to be performed when an operation of accessing a subscription target resource is matched with a specific value. The first condition information may enable monitoring to be performed on whether an operation of accessing the subscription target resource is attempted irrespective of whether or not the operation of accessing the subscription target resource is performed. For example, the first condition information may have a name such as operationMonitor. For example, when a malicious application or devices attempt to access the subscription target resource, there is no resource change due to access rights. However, If the first condition information is configured in a subscription resource (or a filtering attribute), it is able to monitor the malicious attempt. The first condition information may be set to a string argument such as Create, Retrieve, Update, Delete, or Notify. Condition information according to the present invention may be configured in addition to conditions shown in an example of Table 2.

According to the present invention, when a subscription target resource is changed by a specific operation, the condition information about the subscription target operation may include second condition information indicating that a notification is to be performed when a changed status of the subscription target resource is matched with a specific status. Together with the first condition information, the second condition information may be useful for checking a resource status when the subscription target operation is performed. The second condition information may be set to a value or string indicating a status of a resource such as Created (or a child resource is created), Updated, Deleted (or a child resource is deleted). In addition, if a subscription target is deleted, the second condition may be set to Itself Deleted. For example, the second condition information may have a name such as resourceStatus.

Additionally, the condition information about the subscription target operation according to the present invention may include third condition information indicating that a notification is to be performed when a result of performing the subscription target operation corresponds to a specific value and/or fourth condition information indicating that a notification is to be performed when identification information (e.g., URI, ID) of a device (or an entity) which has sent a request message for a subscription resource corresponds to a specific value or string. For example, the third condition information may be set to a success code (e.g., Success, Okay, Okay and Done, Okay and Scheduled, Okay and In Progress), a failure code (e.g., Not okay) or an error code. For example, the fourth condition information may be set to identification information of a device or entity having proper authority.

A hosting device/entity may prevent the first and the second condition information from being configured as a filtering attribute at the same time. Or, in case that the first and the second condition information are configured as a filtering attribute at the same time, when the first and the second condition information are configured for an identical operation, the second condition information may be preferentially configured (while the first condition information is ignored) and a notification for a corresponding operation is sent when the second condition information is satisfied. If either the first condition information or the second condition information is configured for a specific operation, a notification for the specific operation is sent when specific condition information (the first condition information or the second condition information) is satisfied.

The condition information about the subscription target operation may be delivered through a subscription resource creation procedure to a device (or CSE of the device) (or, a hosting device/entity) in which a subscription resource is created/configured. Or, the condition information about the subscription target operation may be delivered to the device/ entity through an update procedure for the subscription resource. A request for a subscription resource may be transmitted in the subscription resource creation procedure or the update procedure (refer to FIG. 9). Aside from the information described with reference to FIG. 9, the request (e.g., in cn information) for the subscription resource may include information about a subscription target operation, information about a status of a resource to perform a notification after a subscription target operation is performed, a result of performing a subscription target operation, and identification information (e.g., URI, ID) of a device (or entity) which has sent a request message for a subscription resource. For example, the information about a status of a resource to perform a notification after a subscription target operation is performed may include Created, Deleted, Retrieved, Updated, and the like. And, for example, the result of performing a subscription target operation may include a success code (e.g., Success, Okay, Okay and Done, Okay and Scheduled, Okay and In Progress), a failure code (e.g., Not okay) or an error code.

Deliver when subscription resource is created

Condition information about a subscription target operation according to the present invention may be added to specific information in a creation request message (e.g., CREATE request) of a subscription resource. For example, the condition information about the subscription target operation may be included in cn information of the creation request message. Or, identification information of a device (or an entity), which has sent the subscription resource creation request message, may be included in fr information of the creation request message.

Deliver by updating subscription resource

Condition information about a subscription target operation according to the present invention may be added to specific information in an update request message (e.g., UPDATE request) of a subscription resource. For example, the condition information about the subscription target operation may be included in cn information of the update request message. Or, identification information of a device (or an entity), which has sent the subscription resource update request message, may be included in fr information of the update request message.

If a receiver (e.g., a receiving device or an entity) receives condition information about a subscription target operation via a request message, the receiver may add the condition information under a subscription resource. For example, the receiver may add the condition information about the subscription target operation to a filtering attribute (e.g., filterCriteria) of the subscription resource.

If a request for a specific operation is received, a hosting device or entity checks whether the specific operation is related to a subscription target resource with reference to address information (e.g., to information) included in the request message. If the address information included in the request message corresponds to URI of the subscription target resource, it is able to determine whether the specific operation corresponds to the subscription target operation with reference to the filtering attribute (e.g., filterCriteria) of the subscription resource. If the specific operation corresponds to the subscription target operation, the receiver may send a notification to an address (e.g., notificationURI) included in the subscription resource. In this case, for example, the notification message may additionally include a subscription target operation, a resource status after the subscription target operation is performed, or a result of performing the subscription target operation. For example, (attribute) information about the subscription target operation may include Create, Delete, Retrieve, Update, Notify, and the like. And, for example, (attribute) information about the resource status after the subscription target operation is performed may include Created (a child resource has been created), Deleted (a child resource has been deleted), Updated, Itself Deleted (a corresponding resource has been deleted), and the like. And, for example, the result of performing the subscription target operation may include a success code (e.g., Success, Okay, Okay and Done, Okay and Scheduled, Okay and In Progress), a failure code (e.g., Not okay), or an error code. For example, if the address information included in the request message is identical to URI of the subscription target resource or includes the URI of the subscription target resource, the address information included in the request message may correspond to the URI of the subscription target resource, and in this case it is possible to subscribe to a specific operation according to configuration of the subscription resource.

Figure 12:
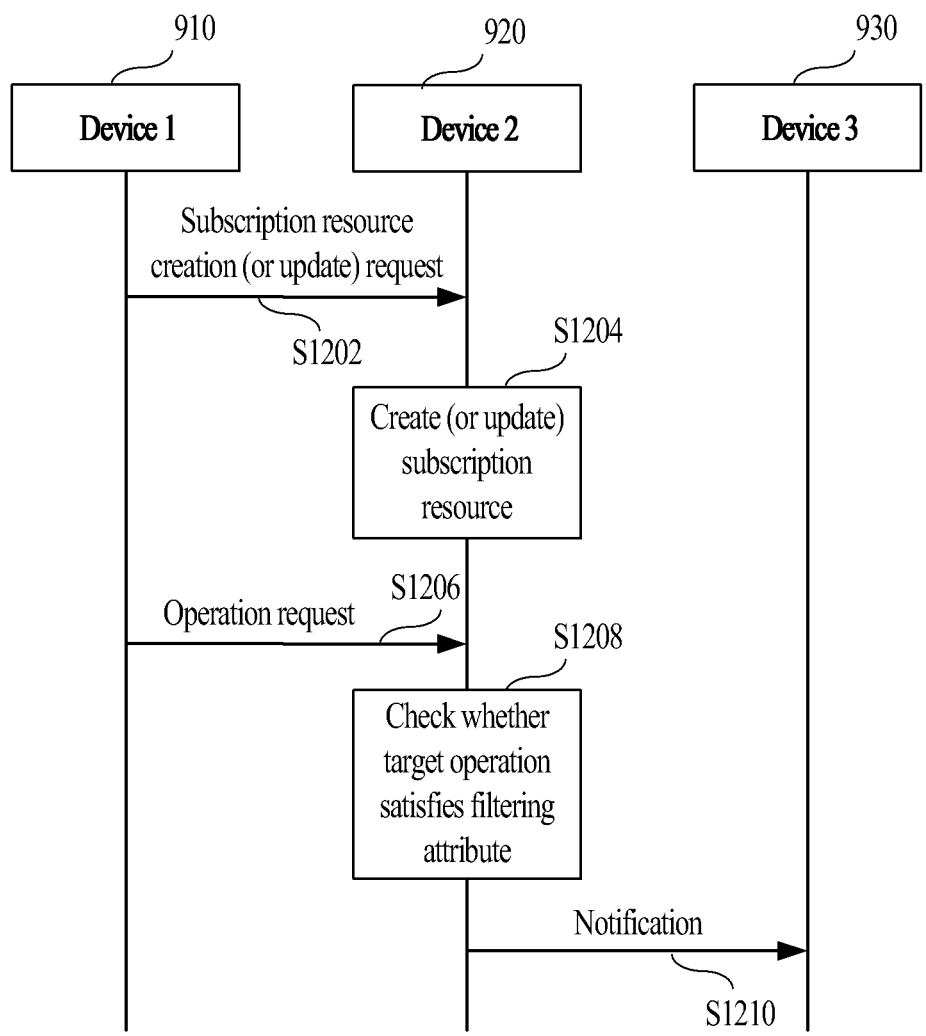
FIG. 12 illustrates an exemplary method for an operation subscription according to the present invention.

FIG. 12 illustrates an exemplary method for an operation subscription according to the present invention. In FIG. 12, each device 910, 920, 930 may include AE and/or CSE, and each step in FIG. 12 may be performed by the AE or the CSE included in each device 910, 920, 930.

Referring to FIG. 12, in step S1202, device 1 910 may send a request message (e.g., CREATE request) to device 2 920 to create a subscription resource. In this case, the request message may include (attribute) information about a subscription target operation. If a subscription resource is already created, a request message (e.g., UPDATE request) to update a filtering attribute of the subscription resource may be sent, and the request message may include (attribute) information about a subscription target operation.

In step S1202, if the request message (e.g., CREATE request) for creating the subscription resource is received, device 2 920 may create the subscription resource using information included in the request message. For example, device 2 920 creates the subscription resource with reference to a parent URI of the subscription resource included in to information of the request message (e.g., CREATE request) and may configure attributes of the subscription resource with reference to attribute information included in cn information. In this case, the (attribute) information about the subscription target operation may be set to a filtering attribute (e.g., filterCriteria) under the subscription resource.

In step S1202, if the request message (e.g., UPDATE request) for updating the subscription resource is received, device 2 920 may update the subscription resource using information included in the request message. For example, device 2 920 may identify a position of the subscription resource with reference to URI of the subscription resource included in to information of the request message (e.g., UPDATE request) and may update filtering attribute (e.g., filterCriteria) of the subscription resource using (attribute) information about the subscription target operation included in cn information. Or, if URI of the filtering attribute of the subscription resource is included in to information of the request message (e.g., UPDATE request) and all or a part of the filtering attribute is included in cn information, device 2 920 may update the filtering attribute (e.g., filterCriteria) of the subscription resource.

Having received the (attribute) information about the subscription target operation via step S1202 and step S1204, device 2 920 may add the (attribute) information about the subscription target operation to the filtering attribute of the subscription resource. For example, if the (attribute) information about the subscription target operation includes information indicating the subscription target operation, device 2 920 may add first condition information (e.g., operationMonitor) to the filtering attribute of the subscription resource. Or, for example, if the (attribute) information about the subscription target operation includes information indicating a status of a resource to perform a notification after the operation is performed, device 2 920 may add second condition information (e.g., resourceStatus) to the filtering attribute of the subscription resource. Or, for example, if the (attribute) information about the subscription target operation includes information indicating a result of performing the subscription target operation to perform a notification, device 2 920 may add third condition information to the filtering attribute of the subscription resource. Or, for example, if the (attribute) information about the subscription target operation includes identification information of a specific device as a condition for performing a notification, device 2 920 may add fourth condition information to the filtering attribute of the subscription resource.

Subsequently, in step S1206, device 2 920 may receive a request message for performing a specific operation (e.g., Create, Retrieve, Update, Delete and the like). The request message received in step S1206 may include second information indicating first information corresponding to URI of a subscription target resource and/or second information indicating an operation to be performed for the subscription target resource (or a child resource of the subscription target resource).

In step S1208, device 2 920 determines whether a condition for sending a notification message is satisfied. For example, device 2 920 may determine whether or not a subscription target resource includes a subscription resource with reference to the first information. In this case, device 2 920 may determine whether or not the subscription target resource corresponding to the first information is in a parent-child resource relation with the subscription resource. Or, for example, device 2 920 may determine whether or not the filtering attribute of the subscription resource includes the condition information (e.g., first to fourth condition information) for operation subscription. Or, for example, device 2 920 may determine whether or not the first condition information of the filtering attribute of the subscription resource includes a variable corresponding to an operation indicated by the second information with reference to the second information. Or, for example, when a status of the subscription target resource or a status of a child resource of the subscription target resource is changed by an operation, device 2 920 may determine whether or not the second condition information of the filtering attribute of the subscription resource includes a variable corresponding to a changed status. Or, for example, device 2 920 may determine whether or not device 1 910 has a retrieval permission for the subscription target resource. Or, for example, if device 1 910 and device 3 930 are different from each other, device 2 920 may determine whether or not device 1 910 has access rights to send a notification message to device 3 930. If the aforementioned conditions are determined and all or a part of the conditions are satisfied, device 2 920 may send a notification message to an entity indicated by address information (e.g., notificationURI) configured in the subscription resource.

If all or a part of the conditions are satisfied in step S1208, in step S1210, device 2 920 may send a notification message to an entity indicated by address information configured in the subscription resource. In the present example, if it is assumed that URI indicating device 3 930 (or a specific entity or a resource in the device 3) has been configured in the subscription resource, the notification message may be sent to device 3 930 (or a specific entity or a resource in the device 3). In the example of FIG. 12, device 1 910 and device 3 930 may be the same or different from each other.

For example, if the first condition information is added to the filtering attribute of the subscription resource, the notification message sent in step S1210 may include information (e.g. information corresponding to the second information in step S1206) about the subscription target operation. Similarly, if the second information is added to the filtering attribute of the subscription resource, the notification message may include information indicating a resource status after the subscription target operation is performed. Similarly, if the third/fourth information is added to the filtering attribute of the subscription resource, the notification message may include the corresponding information.

Although there is no change in a resource status since the subscription target operation corresponds to a retrieval operation, a notification message may be sent through the method described in the example of FIG. 12. And, if the subscription target operation corresponds to a creation (Create) operation, although a resource positioned at a level different from a level of the subscription resource is created under the subscription target resource, a notification message may be sent. Similarly, if the subscription target operation corresponds to a deletion (Delete) operation, although the entire subscription target resource is deleted, a notification message may be sent.

Although a subscription resource is configured to subscribe to a specific operation, if a status of the subscription target resource changes, as mentioned in the foregoing description, a notification may be sent to an address configured in the subscription resource. Hence, although the specific operation does not satisfy a filtering attribute, the notification may be sent according to configuration of the subscription resource. In this case, the notification message does not additionally include information about a subscription target operation. For example, if the specific operation does not satisfy the filtering attribute and there is a status change of the subscription target resource only, the notification message may include modified content, changed URI, additional information, or the like of the subscription target resource.

Figure 13:
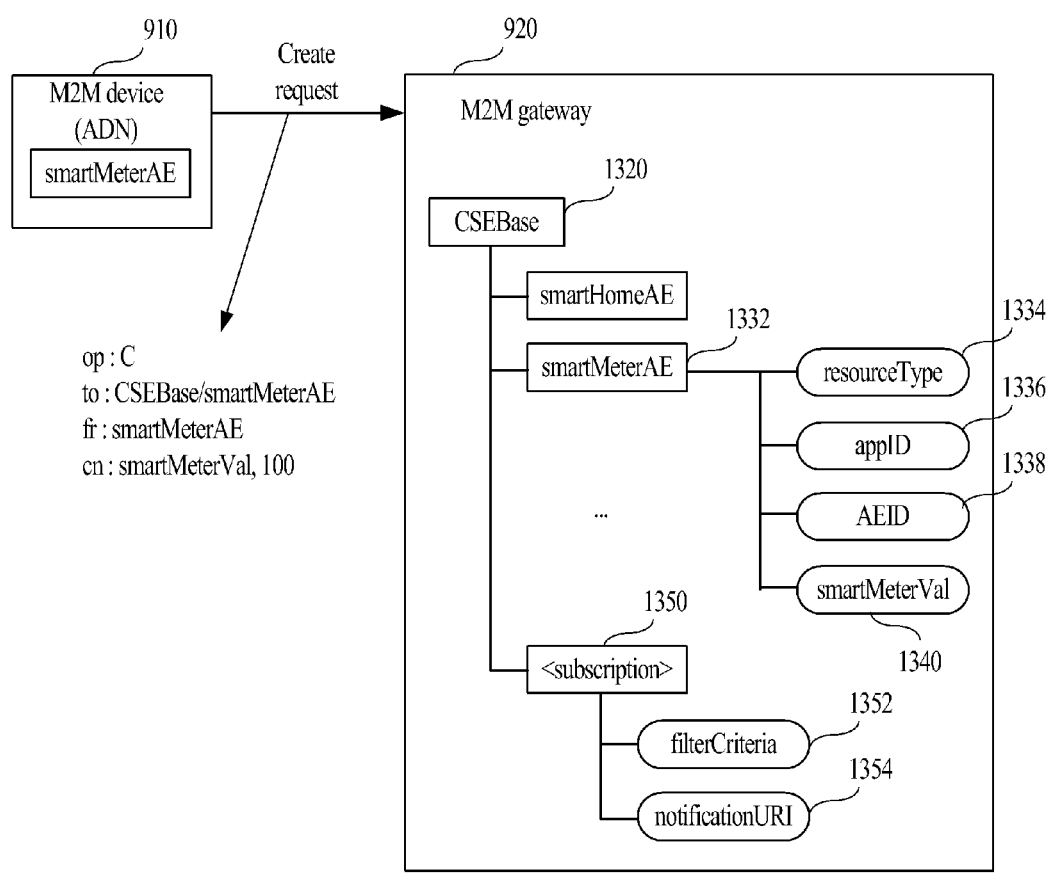
FIG. 13 illustrates an embodiment according to the present invention.

FIG. 13 illustrates an embodiment according to the present invention. In the example shown in FIG. 13, assume that subscription resource 1350 is created under CSEBase resource 1320. Hence, a subscription target resource corresponds to CSEBase resource 1320. And, assume that first condition information and second condition information according to the present invention are set to filtering attribute 1352. For example, in filtering attribute 1352, assume that the second condition information is configured as CREATED. And, assume that address information 1354 of the subscription resource is configured as URI of a smart grid management server.

In the example of FIG. 13, assume that M2M device 910 operates as a smart meter and corresponds to an ADN (application dedicated node) without a common service layer. Hence, M2M device 910 has a constrained capability and may not store or manage data by itself. M2M device 910 may store all metering data in M2M gateway 920. M2M device 910 periodically may read an amount of power usage and may create an attribute under application resource 1332 of the M2M gateway 920 to store an amount of power usage used for a corresponding period. For example, in order to store a measured amount of power usage for a year, the M2M device may create smartMeterVal attribute 1340. To this end, M2M device 910 may send a creation request message to M2M gateway 920. In the present example, the creation request message may include information described in the following.

op: Since this information indicates a requested operation, this information is set to C (Create)

to: Since this information indicates a parent ID of a creation target resource, this information is set to "CSEBase/smartMeterAE"

fr: Since this information indicates originator identification information of a creation request message, this information is set to "smartMeterAE"

cn: This information includes "smartMeterVal" as a name of a creation target attribute and data "100"

Having received the creation request message, M2M gateway 920 may create smartMeterVal attribute 1340 using information included in the creation request message according to the aforementioned procedure. And, M2M gateway 920 is able to know an operation related to a subscription target resource with reference to the to information and is able to know that the second condition information is configured as CREATED in filtering attribute 1352 with reference to filtering attribute 1352. In the present example, since the information (e.g., op) on the operation included in the creation request message is set to C (Create) and smartMeterVal attribute 1340 is successfully created according to the creation request message, M2M gateway 920 may determine it as the operation satisfies the filtering attribute. Hence, M2M gateway 920 may send a notification message to the smart grid management server indicated by address information 1354 configured in the subscription resource. In this case, the notification message may include information (e.g., CREATE) about a subscription target operation and information (e.g., CREATED) about a resource status after the operation is performed.

If M2M device 910 is unable to have resource creation right or has no right for smartMeterAE resource 1332, since M2M gateway 920 is unable to create the corresponding resource, a notification is not generated. In this case, although M2M device 910 has no proper right, if the first condition information according to the present invention is configured in filtering attribute 1352 of the subscription resource only, a notification may be generated.

Meanwhile, if both the first condition information and the second condition information according to the present invention are not configured in filtering attribute 1352 of the subscription resource, although smartMeterVal attribute 1340 is successfully created, since a change of a resource does not correspond to a range of subscription resource 1350, a notification is not generated (due to an access right problem and the like). In this case, there may exist a problem in that the smart grid management server is unable to instantly know metering information created by smart meter 910.

Using a combination of the first condition information and the third condition information, if an operation specified by the first condition information for a subscription target resource satisfies a condition for a success or a failure specified by third condition information, a notification may be performed. Of course, using a combination of the fourth condition information, if an originator condition specified by fourth condition information is satisfied, a notification may be performed.

And, the first condition information and/or the second condition information of the present invention may be used in combined with attributes shown in the example of Table 2. For example, if the first condition information is configured together with condition information (e.g., resourceType) related to a resource type, it is possible to monitor an operation for a specific resource type. For example, if the first condition information is configured as CREATE and the condition information (e.g., resourceType) related to the resource type is configured by <application> or <AE>, when an instance of an application entity resource type (<application> or <AE>) is created, a notification message may be transmitted. In another example, if the first condition information is configured together with condition information (e.g., labels) related to a label of a specific resource, it may be able to monitor an operation for a resource including the corresponding label. In still another example, if the first condition information is configured together with condition information (e.g., contentType) related to a specific content type, it is possible to monitor an operation for a resource including the corresponding content type.

And, the second condition information (e.g., resourceStatus) of the present invention may also be used in combined with the attributes shown in the example of Table 2. For example, if the second condition information is configured together with condition information (e.g., resourceType) related to a resource type, it is possible to monitor whether a result of an operation related to a specific resource type satisfies the second condition information. In another example, if the first condition information is configured together with condition information (e.g., labels) related to a label of a specific resource, it may be able to monitor whether a result of an operation for a resource including the corresponding label satisfies the second condition information. In still another example, if the first condition information is configured together with condition information (e.g., contentType) related to a specific content type, it is possible to monitor whether a result of an operation for a resource including the corresponding content type satisfies the second condition information.

In the present specification, although it is not explicitly described in the present invention, it may be clearly understood that a filtering attribute (e.g., filterCriteria) is configured to monitor various operations in a manner of combining the condition information shown in the example of Table 2 with the condition information (e.g., first condition information to fourth condition information) according to the present invention.

If an operation subscription method according to the present invention is applied, it is also able to subscribe to an operation by which a resource change does not occur. Hence, it is able to flexibly cope with a malicious attack such as DDOS attack. And, if the present invention is applied, since it is also able to subscribe to a not executed command, it is able to efficiently handle an access right configuration error of a specific device or a malicious attempt. Further, if the present invention is applied, since it is able to track a specific operation via operation subscription, it is able to construct statistic information about an operation performed for a specific resource. Still further, if the present invention is applied, since it is able to configure not only a condition for a resource change but also a condition for a specific operation, it is able to reduce an unnecessary notification message and selectively subscribe to an interested notification message only. Still further, if the present invention is applied, it is able to update information about a resource/attribute in real time via operation subscription. As mentioned in the foregoing description, since the operation subscription method according to the present invention provides significant technical effects and advantages.

An access control method capable of being applied to the operation subscription method according to the present invention is described in the following.

1. Operation subscription is allowed when having an access right for a retrieval operation.

2. Access right value for operation subscription of a specific operation may be different from access right value for the specific operation. For example, different access right values may be used for retrieving a resource and subscribing a retrieval operation.

3. In case of having an access right for a specific operation, subscription to the specific operation is allowed. For example, in case of having an access right for creating a resource, it is allowed to subscribe a creation operation.

In case of sending a notification, if having a retrieve right for a resource sending the notification, a transmission of the notification may be allowed. On the other hand, if not having the retrieve right, the transmission of the notification may not allowed.

Figure 14:
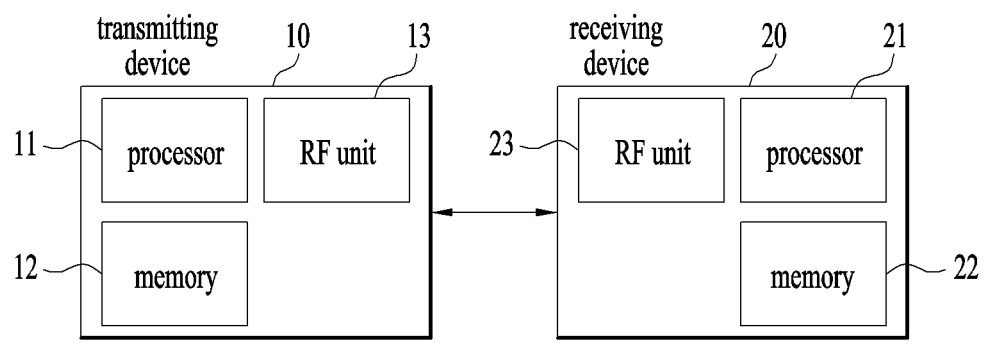
FIG. 14 illustrates a block diagram of a device to which the present invention is applicable.

FIG. 14 illustrates a block diagram of a device according to embodiment(s) of the present invention. In the present invention, each of M2M gateway, M2M server, or M2M device may operate as a transmitting device 10 or a receiving device 20.

The transmitting device 10 and the receiving device 20 respectively include radio frequency (RF) units 13, 23 for transmitting and receiving radio signals carrying information, data, signals, and/or messages, memories 12, 22 for storing information related to communication in a wireless communication system, and processors 11, 21 operatively connected to the RF units 13, 23 and the memories 12, 22 and configured to control the memories 12, 22 and/or the RF units 13, 23 so as to perform at least one of the above-described embodiments of the present invention.

The memories 12, 22 may store programs for processing and control of the processors 11, 21 and may temporarily storing input/output information. The memories 12, 22 may be used as buffers.

The processors 11, 21 control the overall operation of various modules in the transmitting device 10 or the receiving device 20. The processors 11, 21 may perform various control functions to implement the present invention. The processors 11, 21 may be controllers, microcontrollers, microprocessors, or microcomputers. The processors 11, 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11, 21. If the present invention is implemented using firmware or software, firmware or software may be configured to include modules, procedures, functions, etc. performing the functions or operations of the present invention. Firmware or software configured to perform the present invention may be included in the processors 11, 21 or stored in the memories 12, 22 so as to be driven by the processors 11, 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. A signal processing process of the receiving device 20 is the reverse of the signal processing process of the transmitting device 10. Under the control of the processor 21, the RF unit 23 of the receiving device 10 receives RF signals transmitted by the transmitting device 10. The processor 21 decodes and demodulates the radio signals received through the receive antennas and restores data that the transmitting device 10 wishes to transmit.

The RF units 13, 23 include one or more antennas. An antenna performs a function of transmitting signals processed by the RF units 13, 23 to the exterior or receiving radio signals from the exterior to transfer the radio signals to the RF units 13, 23. FIG. 14 illustrates that the transmitting device and the receiving device communicate through RF units respectively, but the present invention is not limited thereto. In the present invention, the transmitting device and the receiving device may communicate through a wired network. In this case, the RF unit may be replaced with a network interface unit (NIU).

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The base station may be referred to as a fixed station, a node-B (NB), an evolved node-B (eNB), an access point (AP), etc. A terminal may be referred to as a user equipment (UE), a mobile station (MS), a mobile subscriber station (MSS), etc.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a communication apparatus such as a terminal, a server, a gateway, etc.

What is claimed is:

1. A method performed by a Machine-to-Machine (M2M) device in which a first resource and a second resource are configured such that the second resource corresponds to a parent resource of the first resource, the method comprising:
   adding first condition information to a filtering attribute of the first resource;
   receiving a request message from a first entity, the request message comprising first information indicating an address corresponding to the second resource and second information indicating an operation to be performed by the M2M device; and
   when a specific condition is satisfied, sending a notification message to a second entity indicated by address information configured in the first resource,
   wherein the specific condition includes the following condition (1):
   (1) when the filtering attribute of the first resource comprises the first condition information and the operation accesses the second resource, the operation matches with a value of the first condition information,
   wherein the operation corresponds to a retrieval, and
   wherein each of the first resource and the second resource represents a data structure which is uniquely addressable using a unique address.

2. The method of claim 1, wherein the first condition information is used for monitoring whether the operation is attempted irrespective of whether the operation is performed.

3. The method of claim 1, wherein the operation further corresponds to a creation, an update, or a deletion.

4. The method of claim 1, wherein the notification message comprises a parameter corresponding to the operation.

5. The method of claim 1, further comprising:
   adding second condition information to the filtering attribute of the first resource,
   wherein the specific condition further includes the following condition (2):
   (2) when the filtering attribute of the first resource comprises the second condition information, and when the second resource or a child resource of the second resource is changed by the operation, a changed status of the second resource or the child resource of the second resource matches with a value of the second condition information.

6. The method of claim 5, wherein when the second condition information is added to the filtering attribute of the first resource, the notification message comprises a parameter corresponding to the changed status.

7. The method of claim 1, wherein the specific condition further includes the following conditions (3) and (4):
   (3) the second entity sending the request message has a retrieve permission for the second resource, and
   (4) when the first entity and the second entity are different from each other, the first entity has an access right for sending a notification message to the second entity.

8. The method of claim 1, wherein the first resource corresponds to a resource for a subscription, and the second resource corresponds to a subscription target resource.

9. A Machine-to-Machine (M2M) device in which a first resource and a second resource are configured such that the second resource corresponds to a parent resource of the first resource, the M2M device comprising:
   a network interface unit; and
   a processor configured to:
   add first condition information to a filtering attribute of the first resource,
   receive a request message from a first entity, the request message comprising first information indicating an address corresponding to the second resource and second information indicating an operation to be performed by the device, and
   when a specific condition is satisfied, send a notification message to a second entity indicated by address information configured in the first resource, wherein the specific condition includes the following condition (1):
   (1) when the filtering attribute of the first resource comprises the first condition information and the operation accesses the second resource, the operation matches with a value of the first condition information,
   wherein the operation corresponds to retrieval, and
   wherein each of the first resource and the second resource represents a data structure which is uniquely addressable using a unique address.

10. The M2M device of claim 8, wherein the first condition information is used for monitoring whether the operation is attempted irrespective of whether the operation is performed.

11. The M2M device of claim 9, wherein the operation further corresponds to a creation, an update, or a deletion.

12. The M2M device of claim 9, wherein the notification message comprises a parameter corresponding to the operation.

13. The M2M device of claim 9, wherein the processor is further configured to:
   add second condition information to the filtering attribute of the first resource,
   wherein the specific condition further includes the following condition (2):
      (2) when the filtering attribute of the first resource comprises the second condition information, and when the second resource or a child resource of the second resource is changed by the operation, a changed status of the second resource or the child resource of the second resource matches with a value of the second condition information.

14. The M2M device of claim 13, wherein when the second condition information is added to the filtering attribute of the first resource, the notification message comprises a parameter corresponding to the changed status.

15. The M2M device of claim 9, wherein the specific condition further includes the following conditions (3) and (4):
   (3) the second entity sending the request message has a retrieve permission for the second resource, and
   (4) when the first entity and the second entity are different from each other, the first entity has an access right for sending a notification message to the second entity.

16. The M2M device of claim 9, wherein the first resource corresponds to a resource for a subscription, and the second resource corresponds to a subscription target resource.

\* \* \* \* \*